United States Patent [19]
Boulter

[11] Patent Number: 6,093,312
[45] Date of Patent: *Jul. 25, 2000

[54] ICE DISPENSER WITH AN AIR-COOLED BIN

[75] Inventor: Roger Phillip Boulter, LaSalle, Colo.

[73] Assignee: Entre Pure, Inc., La Salle, Colo.

[ * ] Notice: This patent is subject to a terminal disclaimer.

[21] Appl. No.: 09/010,967

[22] Filed: Jan. 22, 1998

[51] Int. Cl.[7] .............................. B01D 61/12; F25C 5/18
[52] U.S. Cl. ..................... 210/86; 210/109; 210/257.2; 210/258; 62/342; 62/343; 62/344; 222/146.6
[58] Field of Search ................... 62/66–69, 320, 62/321, 340, 342, 343, 344, 356, 352; 210/85, 86, 96.2, 149, 175, 195.1, 257.2, 652, 109, 258, 416.1; 222/129.1, 146.1, 146.6

[56] References Cited

U.S. PATENT DOCUMENTS

| | | | |
|---|---|---|---|
| 3,127,756 | 4/1964 | Field | 62/344 |
| 3,493,496 | 2/1970 | Bray et al. | 210/257.2 |
| 3,856,676 | 12/1974 | Grimme, Jr. et al. | 210/96.2 |
| 3,913,343 | 10/1975 | Rowland et al. | 62/344 |
| 4,176,063 | 11/1979 | Tyler | 210/101 |
| 4,456,149 | 6/1984 | Sciortino | 222/1 |
| 4,623,467 | 11/1986 | Hamlin | 210/652 |
| 4,732,301 | 3/1988 | Tobias et al. | 62/344 |
| 4,753,081 | 6/1988 | Koeneman et al. | 62/356 |
| 4,788,830 | 12/1988 | Schreiner et al. | 62/344 |
| 4,803,847 | 2/1989 | Koeneman | 62/344 |
| 4,808,302 | 2/1989 | Beall, Jr. | 210/117 |
| 4,859,320 | 8/1989 | Beall, Jr. | 210/136 |
| 4,885,085 | 12/1989 | Beall, Jr. | 210/137 |
| 4,897,099 | 1/1990 | Ruff | 62/532 |
| 4,941,902 | 7/1990 | Ruff | 62/532 |
| 5,083,442 | 1/1992 | Vlock | 62/338 |
| 5,112,477 | 5/1992 | Hamlin | 210/85 |
| 5,135,645 | 8/1992 | Sklenak et al. | 210/97 |
| 5,297,401 | 3/1994 | Hawco | 62/340 |
| 5,405,052 | 4/1995 | Sawyer, III | 222/64 |
| 5,484,538 | 1/1996 | Woodward | 210/767 |
| 5,511,388 | 4/1996 | Taylor et al. | 62/389 |
| 5,722,244 | 3/1998 | Shelton | 62/352 |
| 5,910,164 | 6/1999 | Snelling et al. | 62/344 |
| 5,911,884 | 6/1999 | Boulter | 210/257.2 |

OTHER PUBLICATIONS

Hoshizaki America, Inc., Peachtree City, Georgia, ad for KM1600S series Ice Cuber, Undated.

Hoshizaki America, Incl, Peachtree City, Georgid, ad for Model DB 200 seriesSanitary Cube Dispenser, Undated.

Ice–O–Matic, Mile High, Denver, Colorado ad for CD series Cube Ice Dispenser, Undated.

Kloppenberg & Co., Englewood, Colorado ad for Ice Dispenser Bagger, Undated.

*Primary Examiner*—Joseph W. Drodge
*Attorney, Agent, or Firm*—Rick Martin

[57] ABSTRACT

A combination water-purification and ice-dispensing system features an air cooler on the ice bin to prevent the congealing of ice. Four slanted agitator blades also break up chunks of ice back into ice cubes. Excess water from the ice maker is recycled into the ice maker. Double shutters prevent the dispensing of contaminated ice. An ice-bag dispenser and taper are included. A single kiosk can have both a purified water and an ice dispenser.

27 Claims, 22 Drawing Sheets

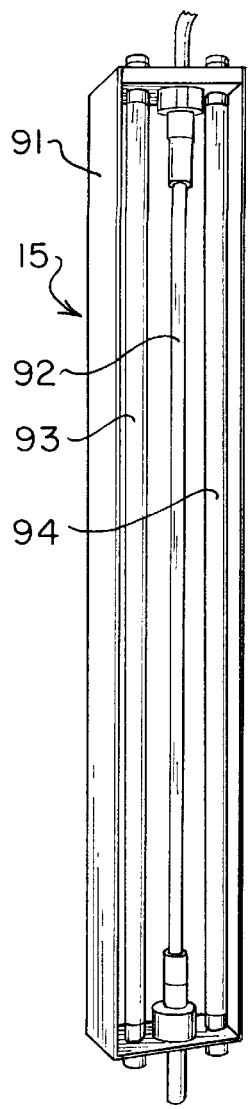
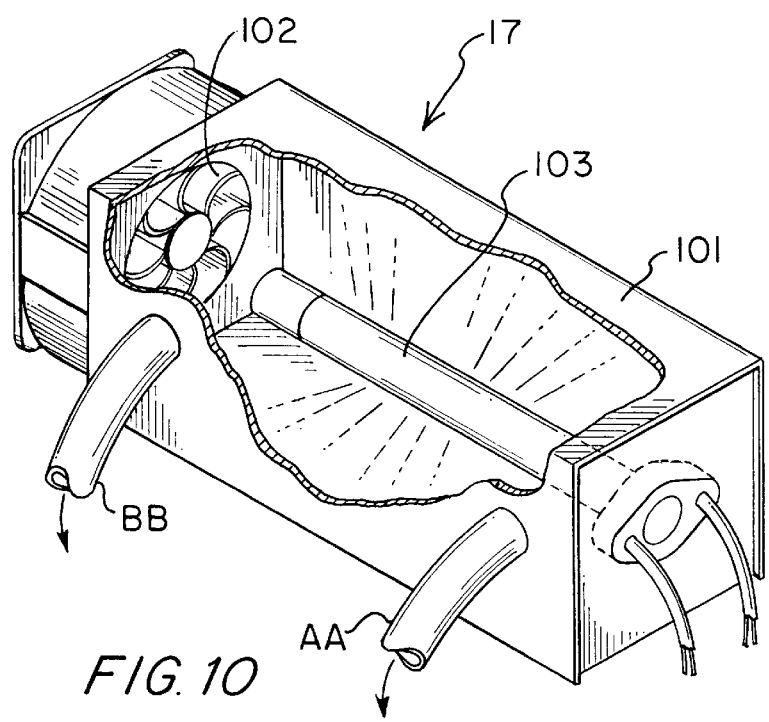
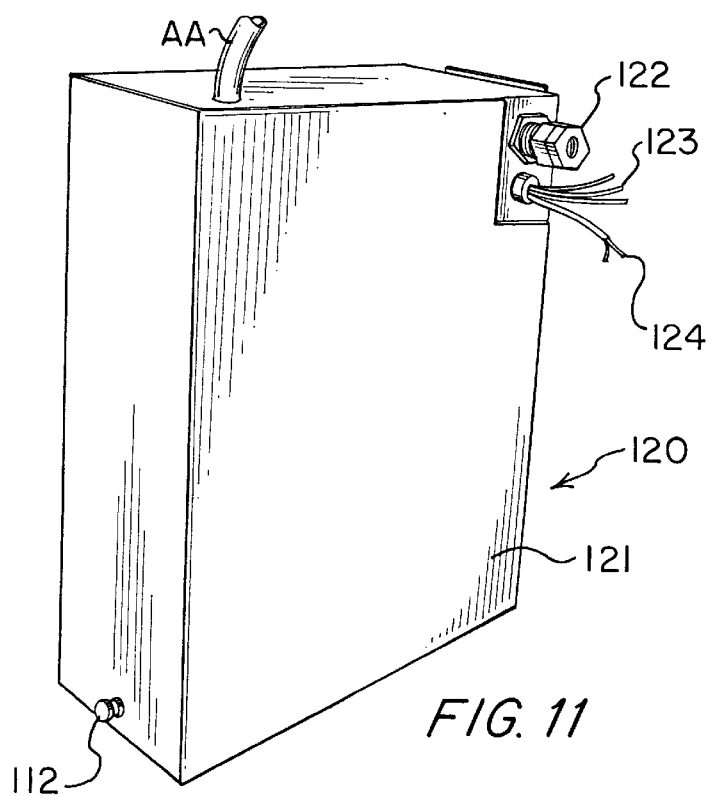
FIG. 9
FIG. 10
FIG. 11

ICE DISPENSER WITH AN AIR-COOLED BIN

CROSS REFERENCED PATENTS

The water purification aspects of the present invention are described in U.S. application Ser. No. 08/759,134 filed Dec. 2, 1996, now U.S. Pat. No. 5,911,884, issued on Jun. 15, 1999, which is hereby incorporated by reference.

FIELD OF INVENTION

The present invention relates to an efficient city water-purification system feeding a vending-machine-style ice dispenser which has an anti-melt ice storage bin featuring an air cooler.

BACKGROUND OF THE INVENTION

The problem of ice congealing and/or thawing in commercial ice-storage bins has never been fully solved. The present invention solves this problem by adding an air cooler to the ice-storage bin. Additionally, rotating agitator blades set at a proper angle slice the stored ice cubes into small sectors solving the problem of storing ice cubes without congealing in a commercial ice dispenser.

Notable attempts to solve this congealing problem include an Ice-O-Matic, Denver, Colo., CD Series Cube Ice Dispenser having a timed agitation of the auger (once every hour).

Known in the art are combination auger and rotating agitator blade ice storage bins. Kloppenberg & Company, Englewood, Colo., makes a commercial ice dispenser and bagger that uses a bottom chute in combination with an auger and a rotating agitator blade. However, the agitator blade is semi-circular in shape, and the unit does not have any circulating air-cooler feature.

The inventive ice bin of the present invention has been integrated into an efficient reverse osmosis water filtration system in a vending machine kiosk. Related commercial vending machine ice dispensers include U.S. Pat. No. 5,484,538 (1996) to Woodward. Woodward teaches the integration of a reverse osmosis water filter, UV light, and carbon treatment of water in a hot and cold water and ice dispensing compact office-sized unit.

A heavy volume purified water and ice dispenser is taught by U.S. Pat. No. 5,112,477 (1992) to Hamlin. Hamlin teaches a reverse-osmosis water filter having a copper-zinc alloy feeding a commercial ice maker and dispenser. The coin-operated unit also features an ice-bag storage and dispensing unit.

In summary, the present invention offers a new and non-obvious solution to the problem of preventing ice cubes from congealing in an ice dispenser. An air-cooled ice bin is integrated into a coin-operated reverse-osmosis purified water and ice dispenser.

SUMMARY OF THE INVENTION

The main aspect of the present invention is to provide an air-cooled ice-storage bin to prevent the congealing of ice.

Another aspect of the present invention is to provide rotating agitator blades rotating at about 80° across the longitudinal axis of the rotating auger.

Another aspect of the present application is to provide a kiosk having a reverse-osmosis water filtration system, a water dispenser and an ice dispenser having an ice bag dispensing apparatus.

Another aspect of the present invention is to provide a double door on the ice bin chute to prevent contamination of the ice.

Other aspects of this invention will appear from the following description and appended claims, reference being made to the accompanying drawings forming a part of this specification wherein like-reference characters designate corresponding parts in the several views.

The present invention consists of a kiosk having a height of about thirteen feet and width of about nine feet. The kiosk is usually placed outdoors, often in a warm climate such as Texas. A reverse-osmosis water-filtration system purifies and dispenses water in a coin-operated water-dispensing window. Additionally, an ice-dispensing window allows the consumer to buy bags of ice made from the purified water. A bag holder, dispenser, and bag taper are included. A double sliding-door design prevents contamination of the ice bin by closing a first door in a soft-close mode which should persuade a child to remove his hand from the chute. Next, a second door closes with full force to seal the ice bin. If full closure is not achieved with both doors, then a "sold out" sign lights, and the coin receiver and bill acceptor will not accept money.

The ice bin receives ice cubes from a commercial ice maker. Once in the bin, the ice is continuously cooled with an air chiller. Periodically, a set of agitator arms churn the ice cubes to further prevent congealing. When ice is directed to be dispensed by the coin receiver and central controller, then an auger rotates at the bottom of the ice bin to propel ice down the exit chute, and an agitator also turns on.

Kiosks can be configured with three dispensing windows. Any combination of water and ice dispensing windows can be installed.

BRIEF DESCRIPTION OF TEE DRAWINGS

FIG. 9 is a front perspective view of the UV portion of the filter system.

FIG. 10 is a cutaway view of the ozone generator.

FIG. 11 is a side view of the nozzle assembly enclosure.

FIG. 21 is a block diagram showing the relationship of FIGS. 22, 23.

FIG. 25 is a block diagram showing the relationship of FIGS. 26, 27.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Water Dispensing Embodiments (FIGS. 1–16)

Figure 1:
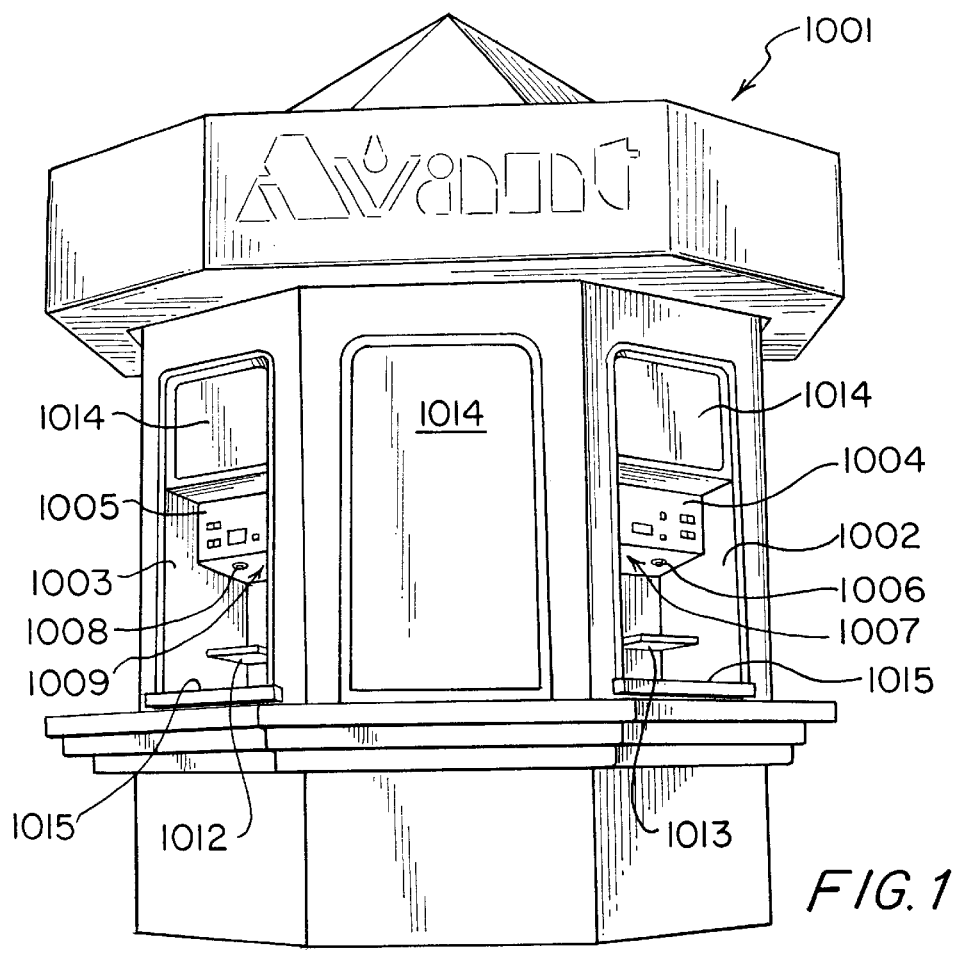
FIG. 1 is a side plan view of the front of the preferred embodiment of the water dispenser.
Figure 2:
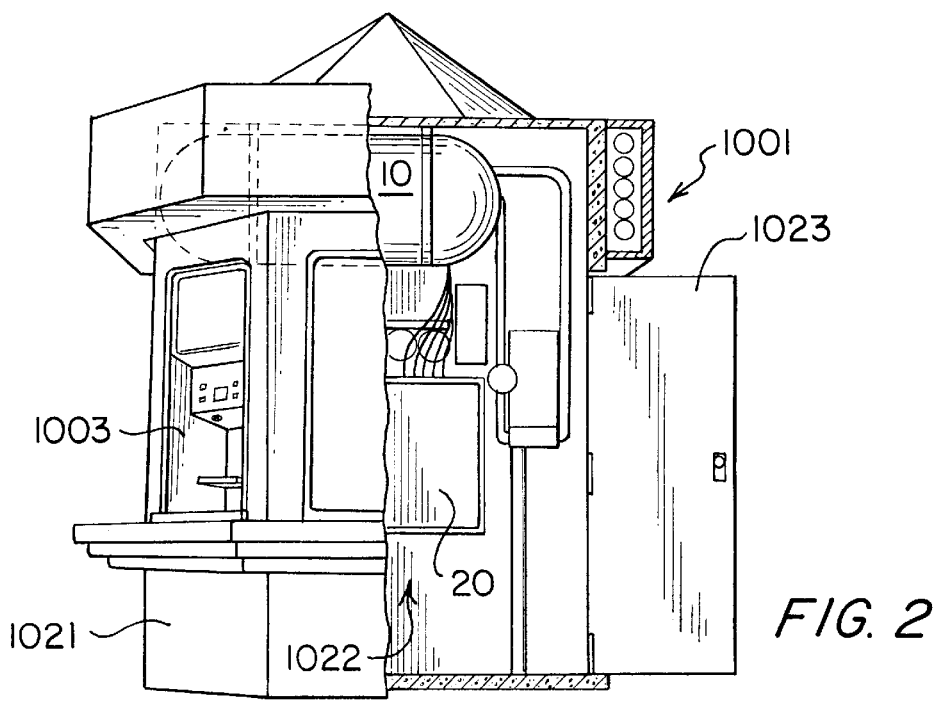
FIG. 2 is a partial cutaway view of the drawing in FIG. 1 showing the maintenance access door and filter system.
Figure 12:
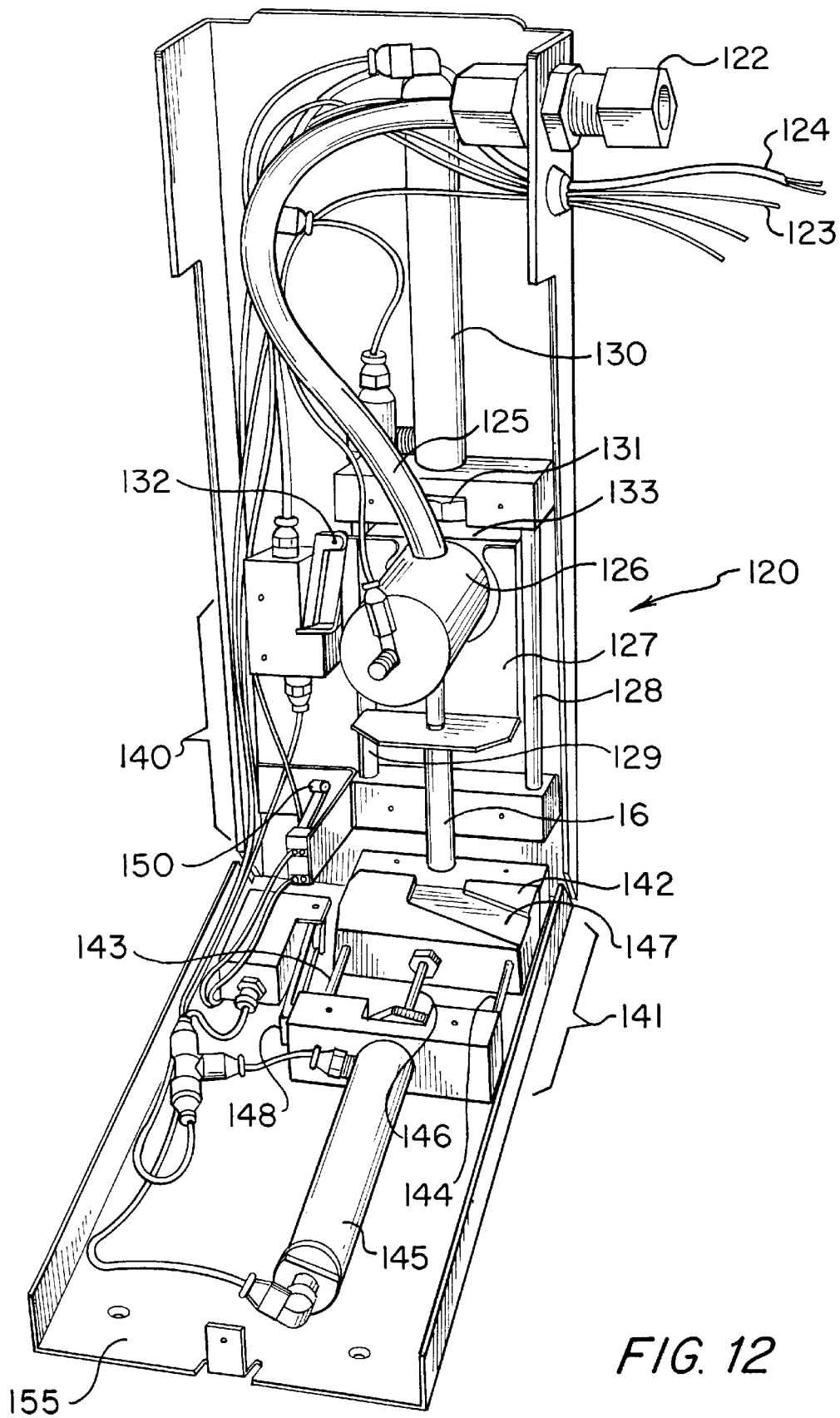
FIG. 12 is a top perspective view of the inside of the nozzle assembly with the nozzle in the retracted position.

Referring first to FIGS. 1,2 a water dispenser 1001 is shaped like a kiosk having signage 1014 to instruct the consumer how to operate the coin-operated dispensers 1004, 1005. The coin-operated dispensers 1004, 1005 are housed in vend windows 1002, 1003. Each coin-operated dispenser 1004, 1005 has two nozzle protectors 1008, 1009 and 1006, 1007. A separate filler mechanism 120 (FIG. 12) serves each nozzle protector and its nozzle 16 (FIG. 12).

In operation the consumer places his five gallon bottle on a ledge 1015. The consumer can place his one gallon bottle on a folding shelf 1012, 1013. The housing 1021 of water dispenser 1001 has maintenance door 1023 for access to the machine room 1022 of FIG. 2. Controller 20 and storage tank 10 are shown.

Figure 3:
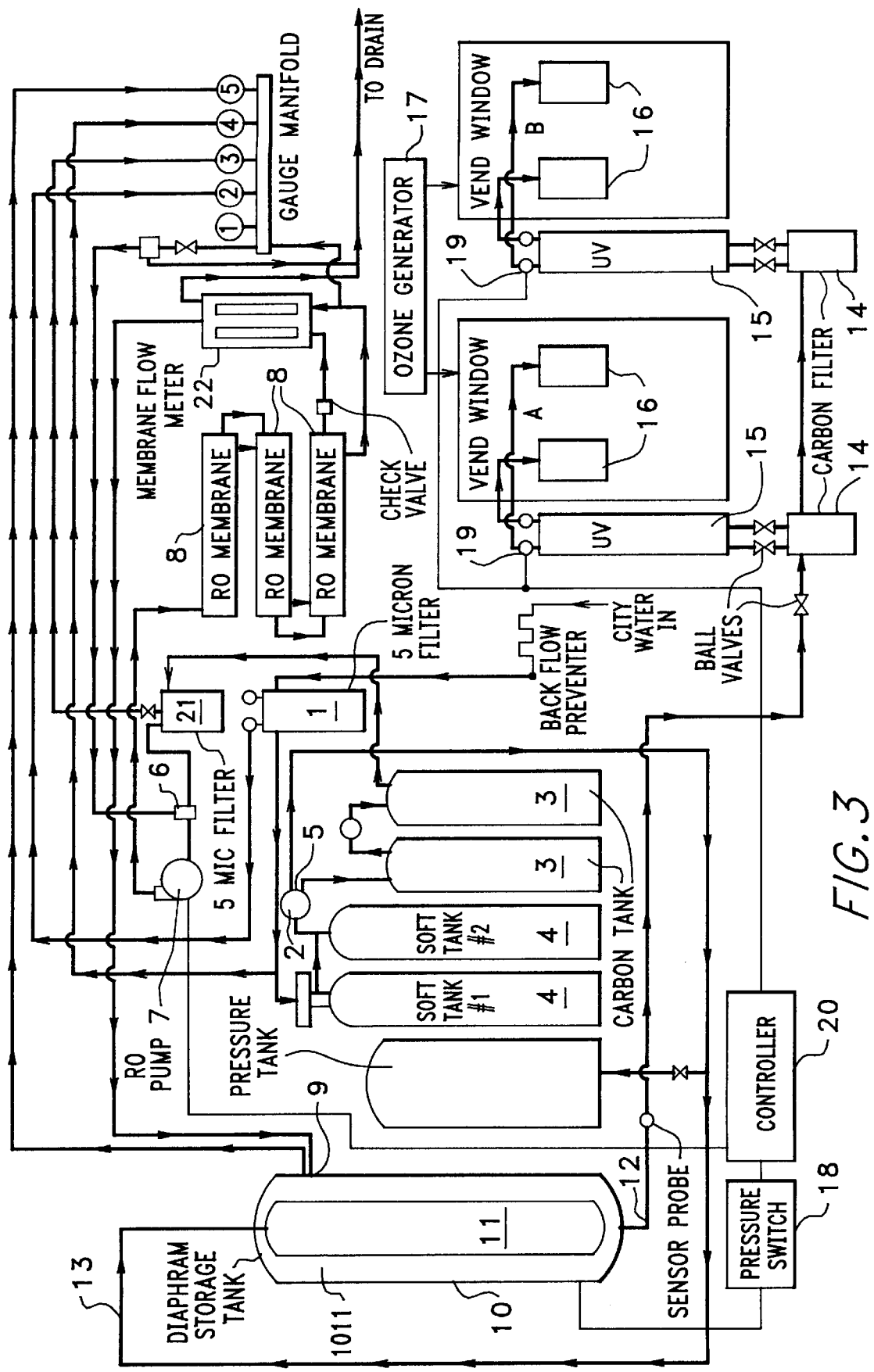
FIG. 3 is a diagrammatic view of the filter system shown in FIG. 2.
Figure 6:
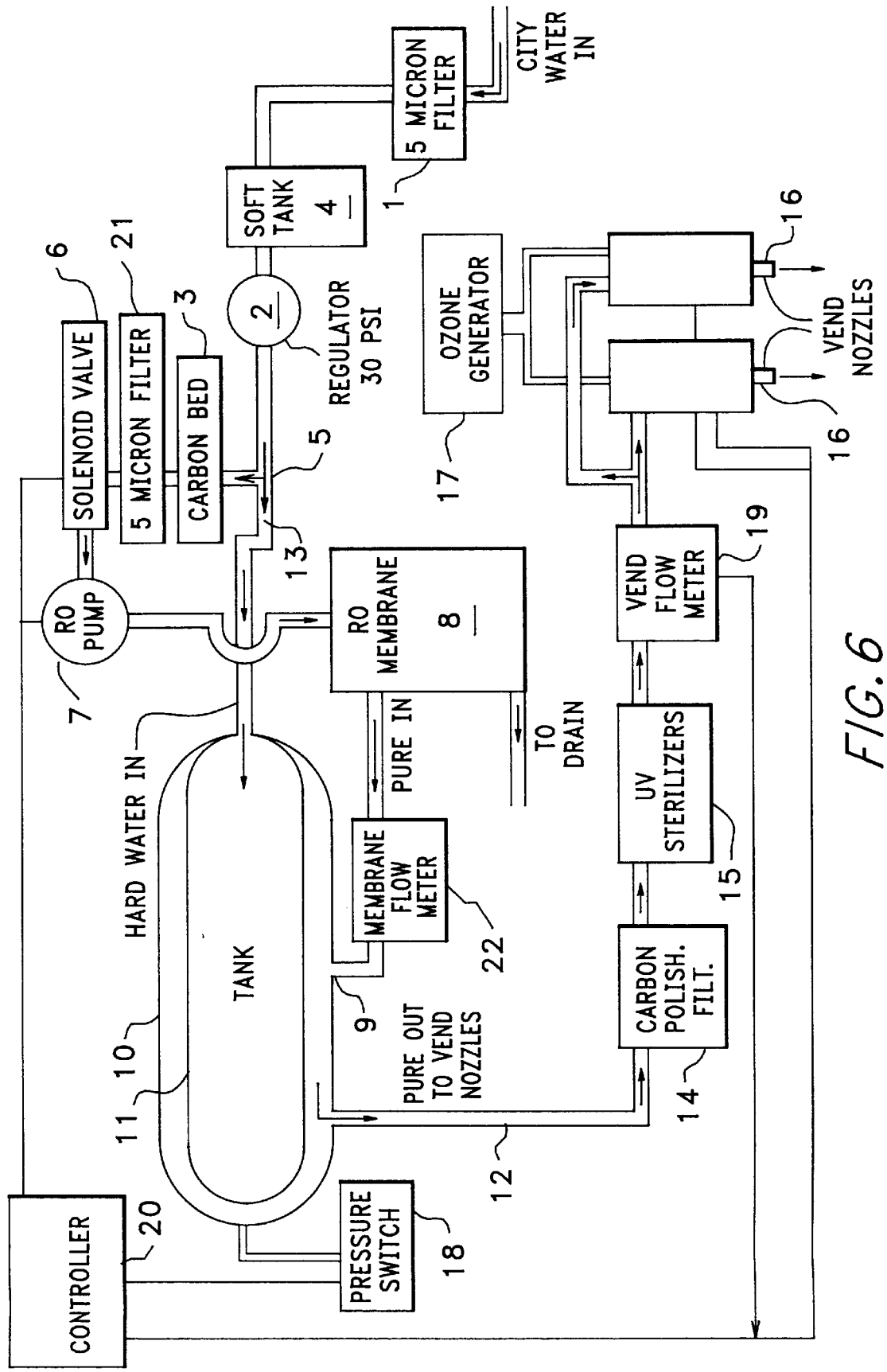
FIG. 6 is a schematic view of the filter and storage system.
Figure 7:
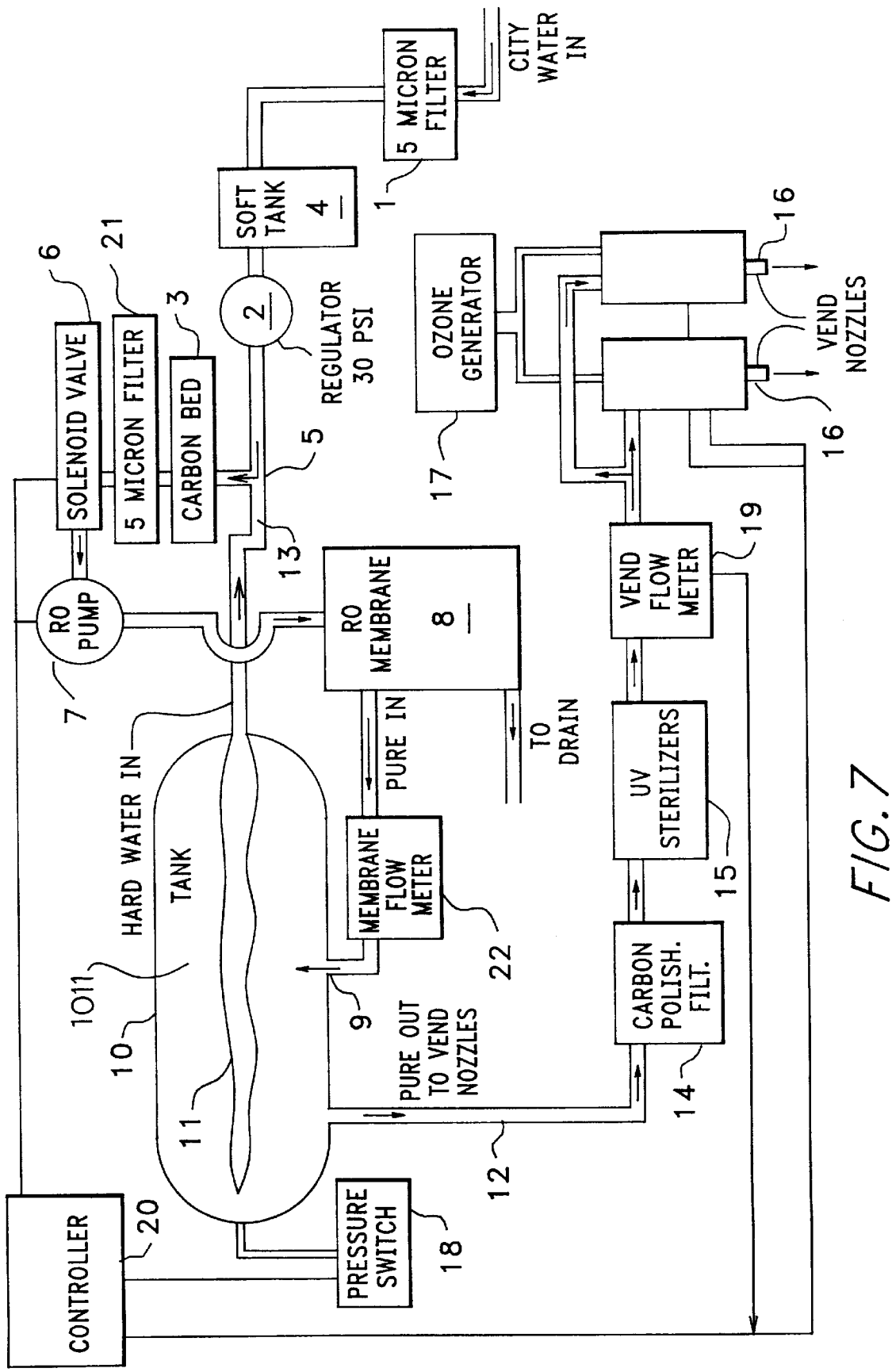
FIG. 7 is the same view as FIG. 6 having the bladder in the deflated state with the outer tank at near maximum storage of purified water.

Referring next to FIG. 3 the machinery housed in the machine room 1022 is shown in a schematic format approximately laid out as in the machine room 1022. FIGS. 6,7 are simplified schematics of the same machinery. FIG. 7 shows the inner bladder 11 in the deflated mode. The logic flow chart of FIG. 8 describes the operational sequence of steps. All the numbers of the components are coordinated to be the same.

Referring next to FIGS. 3, 6, 7, 8 the city water is first filtered by a 5 micron filter 1. Next an ion exchange water softener 4 removes the hardness from the water. Next the water pressure is regulated at 30 psi by regulator 2. Junction 5 allows the water to flow either into water inlet 13 or into a carbon bed filter 3 to de-chlorinate the water. After the carbon bed filter 3, a second 5 micron filter 21 removes any carbon particles from the water. Water inlet 13 feeds the inner bladder 11. Automatically the inner bladder 11 expands under the direct connect to the 30 psi city water (functional block 801). The controller 20 has a counter which counts the total gallons of the purified water dispensed as measured by the membrane flowmeter 22 (functional block 800). The purified water is stored in the pure water side 1011 of the diaphragm storage tank 10. When the counter reaches a preset limit (functional block 802), the controller turns on the reverse osmosis (RO) pump 7 as depicted by functional block 803 and opens the solenoid 6 (functional block 804). The RO pump 7 draws water from both the city water line and the inner bladder 11 through the carbon bed filter 3 and the second 5 micron filter 21. Junction 5 shows the blending of the waters (functional block 805). In a known manner the RO membrane 8 returns about 50% of its input to drain as this water is the high concentrate by-product of the RO process (functional block 806). Inlet 9 shows where the purified water from the RO membrane 8 enters the pure water side 1011 of the diaphragm storage tank 10 (functional block 807). Pressure limit switch 18 shuts off the RO pump (functional blocks 808, 809).

The vendor nozzles 16 dispense water under the control of the coin-operated dispensers (FIG. 2, numbers 1004, 1005). The water is further filtered by the carbon polishing filter 14 and the UV sterilizer 15 as it flows from the pure water outlet 12. All dispensed purified water is volumetrically measured by vend flowmeter 19. The ozone generator 17 constantly discharges ozone in the vendor nozzle 16 environment.

Figure 4:
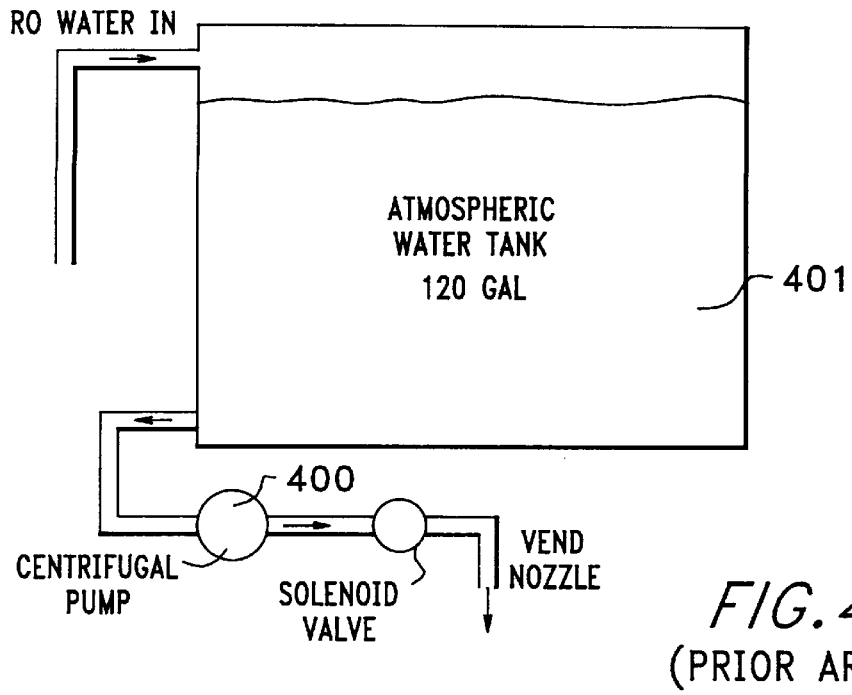
FIG. 4 (prior art) is a diagrammatic view of a centrifugal pump storage system.

The above system reduces the need for a traditional centrifugal pump 400 as shown in FIG. 4. Centrifugal pumps are notoriously prone to breakdown. Also, the above system uses the 30 psi city water pressure in part to force the purified water from the pure water side 1011 of the tank 10, thus conserving energy. The storage tank 401 of FIG. 4 serves the same purpose as the pure water side 1011 of tank 10 of FIGS. 6,7.

Figure 5:
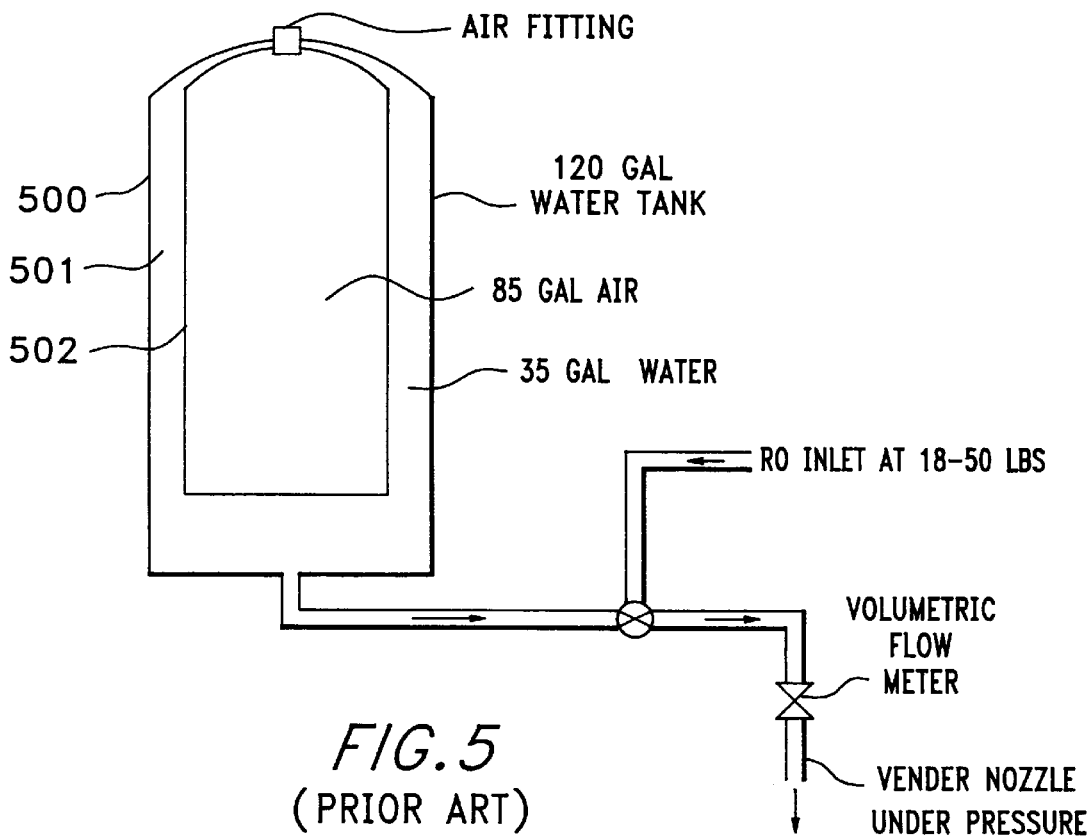
FIG. 5 (prior art) is a diagrammatic view of a bladder type storage tank.

Another prior art system is shown in FIG. 5. The diaphragm storage tank 500 is used in a known manner wherein the bladder 502 is pressurized in order to provide the force to flow the purified water from the pure water side 501 of the tank 500. However, about 85 gallons of air is needed for exit pressure. Thus, only 35 gallons of the 120 gallon tank can store pure water. This space loss is unacceptable in kiosks where space is at a premium. The present invention uses the efficiency of the FIG. 5 air bladder system while saving 85/120 (70%) of the storage tank size requirements.

In summary the process described above can be described as:

pre-filtering city water;
piping the pre-filtered water into an inner bladder of a diaphragm storage tank, to provide pressure to dispense pure water from the diaphragm storage tank;
storing RO filtered water in the pure water storage side of the diaphragm storage tank;
feeding an RO pump with a blend of the stored water in the inner bladder and the pre-filtered city water which has been de-chlorinated;
dispensing the filtered water in the pure water storage side of the diaphragm storage tank after further filtering the water;

measuring the volume of dispensed water; and controlling the RO pump by the measuring the volume of dispensed water so as to maintain a selected minimum volume of water in the pure water side of the diaphragm storage tank.

Referring next to FIG. 9 the UV sterilizer 15 is shown with its front cover removed. The housing 91 is preferably made of stainless steel. The UV lamp 92 is known in the art. Water pipes 93, 94, preferably made of quartz, are transparent to allow the water to be exposed to the UV light.

Referring next to FIG. 10 the ozone generator 17 has a housing 101 enclosing a fan 102 and an ozone lamp 103. Outlet hoses AA, BB each serve a filler mechanism 120. Since each vend window has two filler mechanisms 120, each outlet hose AA, BB has a T connection not shown.

Referring next to FIG. 11 a filler mechanism 120 has a removable housing 121 having a locking screw 112. The ozone is fed in through hose AA. The water inlet connection 122 is a hard screw type to allow quick disconnect for maintenance. Pneumatic lines 123 power all the moving parts while electrical wires 124 serve the micro switches in the filler mechanism.

Referring next to FIG. 12 the filler mechanism 120 has two basic assemblies. The moving pinch valve assembly 140 controls the flow of water and the extension/retraction of the nozzle 16. The shutter assembly 141 forbids access to the nozzle 16 when the filler mechanism is in the passive mode.

The moving pinch valve assembly 140 consists of a flexible water inlet tube 125 and a pinch valve 126 which is mounted to a sliding block 133. The sliding block 133 slides on guide posts 128, 129. A mounting bracket 127 secures the nozzle 16. An actuator 130 having a push rod 131 controllably moves the sliding block into either the retracted position shown or the extended position shown in FIG. 13. The limit switch 132 senses when the sliding block is in the retracted position. The controller 20 closes the shutter 142 when the limit switch 132 senses the sliding block is in the retracted position. The limit switch 150 senses when the nozzle assembly is in the fully extended position so the controller 20 can initiate the dispensing of water.

Figure 13:
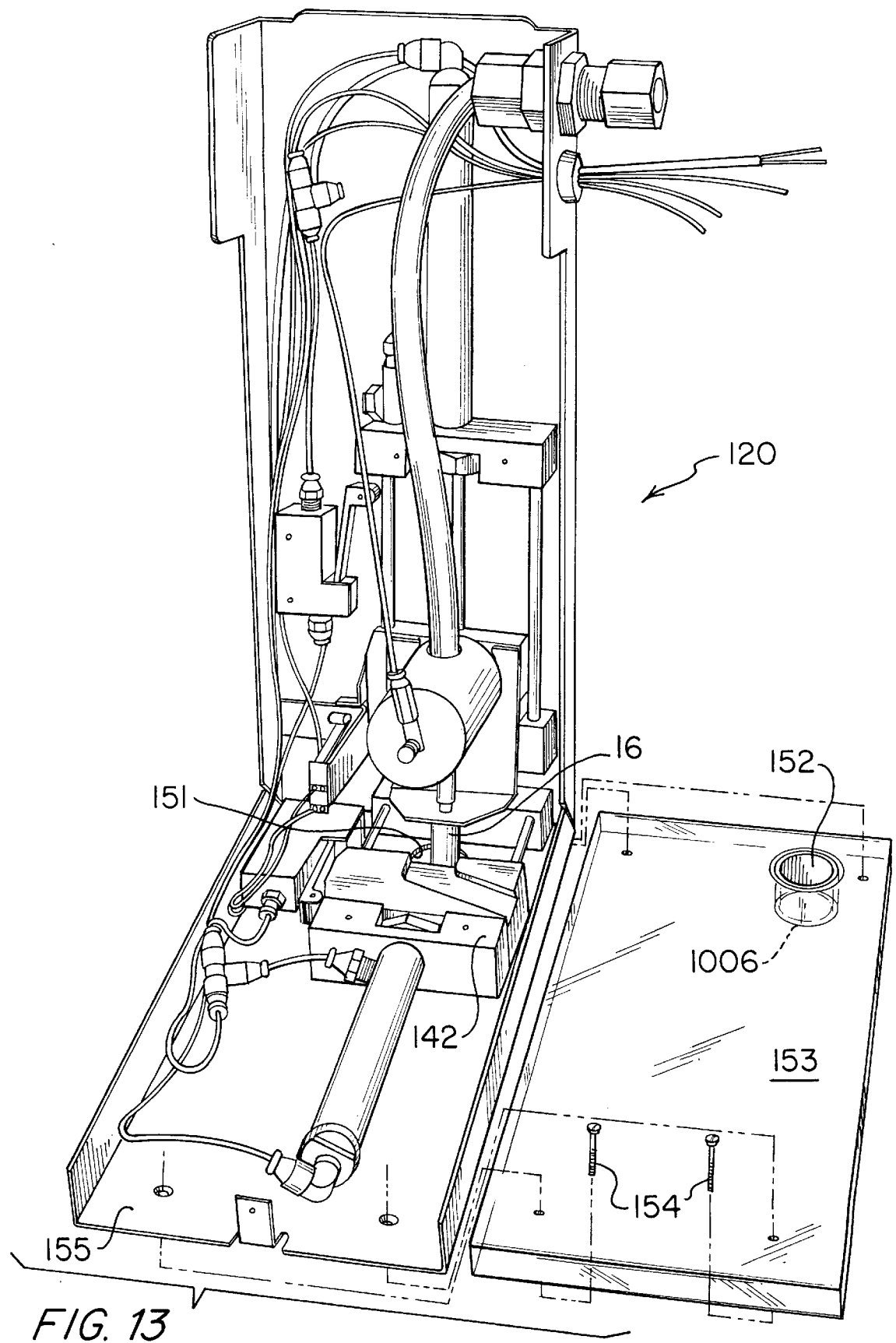
FIG. 13 is the same view as FIG. 12 with the nozzle in the extended position.

The shutter assembly 141 consists of a shutter 142, guide posts 143, 144 and an actuator 145 having a push rod 146. The drainage groove 147 diverts water drips to the side of the housing. The limit switch 148 senses the retracted position of the shutter 142. When the shutter is in the retracted position, the controller 20 activates the nozzle assembly to extend. Preferably both the pinch valve and shutter actuators are pneumatic. However, electric pinch valves are also used. FIG. 13 shows the shutter 142 open and the nozzle 16 extended through hole 151. Hole 151 aligns with hole 152 of the clear plastic baseplate 153. The nozzle protector 1006 is shown in FIG. 1. Bolts 154 secure the baseplate 153 to the base 155 of the filler mechanism 120.

Figure 14:
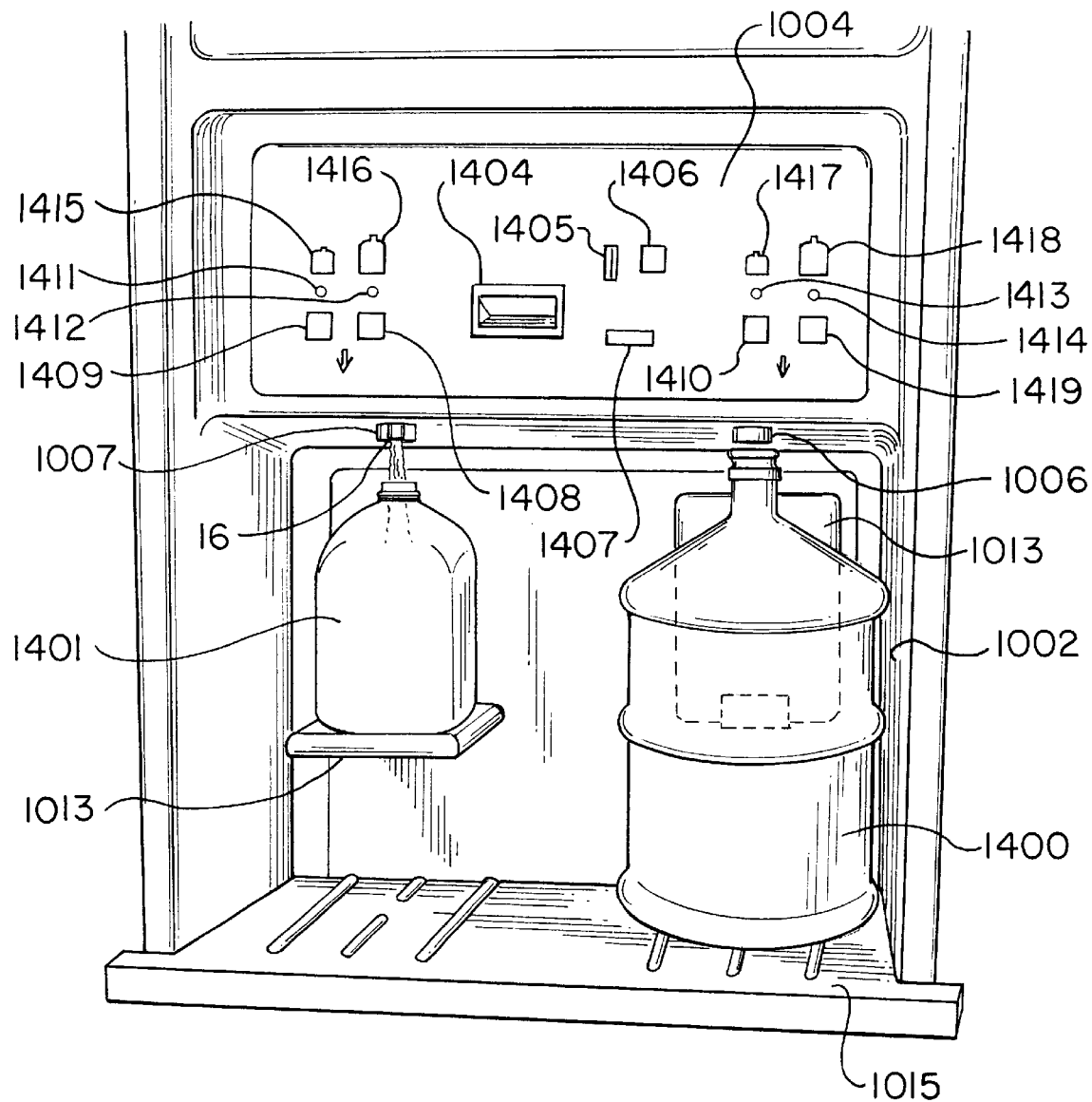
FIG. 14 is a front plan view of one filling station.

Referring next to FIG. 14 the vend window 1002 is filling a one gallon bottle 1401 and a five gallon bottle 1400. The folding shelf 1013 is supporting the one gallon bottle. The coin operated dispenser 1004 is designed for one user having multiple bottles to fill. A bill acceptor 1404 and a coin slot 1405 accept money. A coin return button 1406 returns money. A credit display 1407 shows the user how much money he has deposited. There is a five gallon start button 1419, 1408 on each side. There is a one gallon start button 1409, 1410 on each side. The LED lights 1411, 1412, 1413, 1414 indicate which button has been pushed. Bottle pictures 1415, 1416, 1417, 1418 prompt the user to press the correct button for his bottle size.

Figure 16:
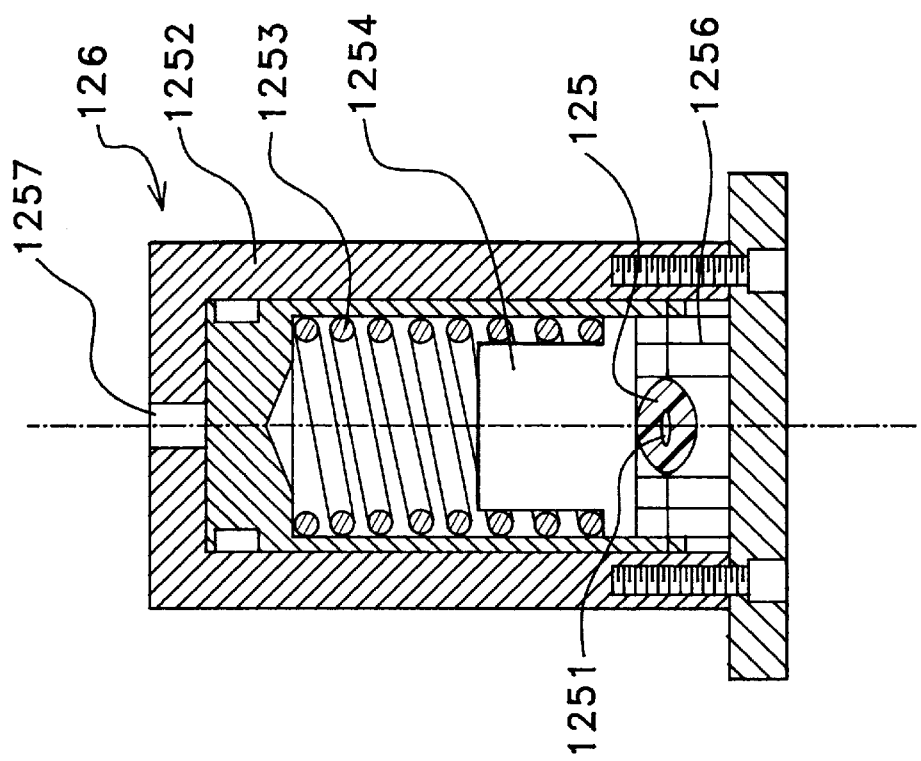
FIG. 16 (prior art) is the same view as FIG. 15 with the pinch valve in the closed position.
Figure 15:
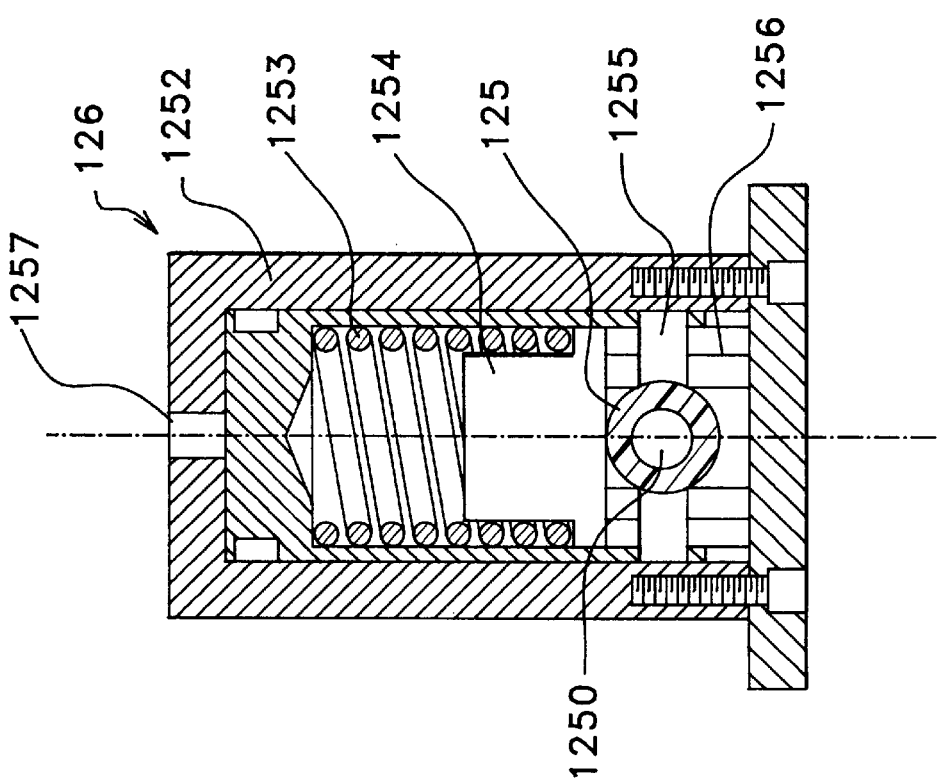
FIG. 15 (prior art) is a sectional view of the pinch valve in the open position.

Referring next to FIGS. 15, 16 the pinch valve 126 is seen to have a housing 1252, a base 1256 and a piston 1254.

Pressurized air entering inlet 1257 drives the piston 1254 against the hose 125 which has an orifice 1250. In FIG. 15 the hose 125 rests in space 1255 and air pressure holds the piston upwards in an open position. In FIG. 16 the spring 1253 has moved the piston 1254 to a normally closed position thus closing orifice 1250 down into a closure 1251.

Water and Ice Dispensing Embodiments (FIGS. 17–34)

Figure 17:
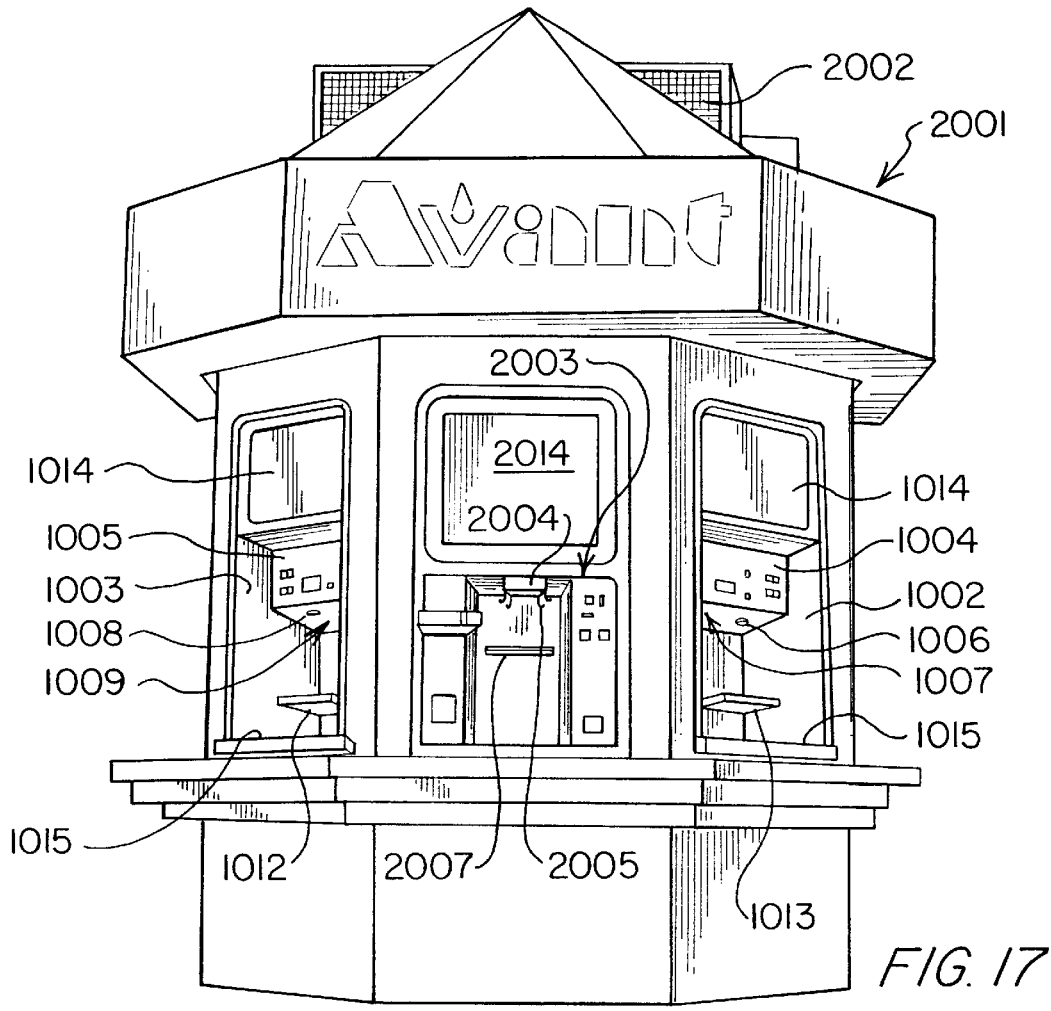
FIG. 17 is a front plan view of a kiosk configured with one ice dispenser and two water dispensers.

Referring next to FIG. 17 the preferred embodiment, water and ice kiosk 2001 is shown. Ice dispensing signage 2014 instructs the consumer how to operate the ice dispensing window 2003. Ice cubes will fall from chute 2004 into a consumer's container or bag (not shown). Portions of a commercial ice maker and a custom air cooler for the ice bin including two compressors and two receivers are housed under the roof cap 2002 on the roof of the kiosk 2001. If the consumer wants an ice bag, then one is dispensed from the bag dispenser 2007. The consumer can then hang the bag on hooks 2005.

Figure 18:
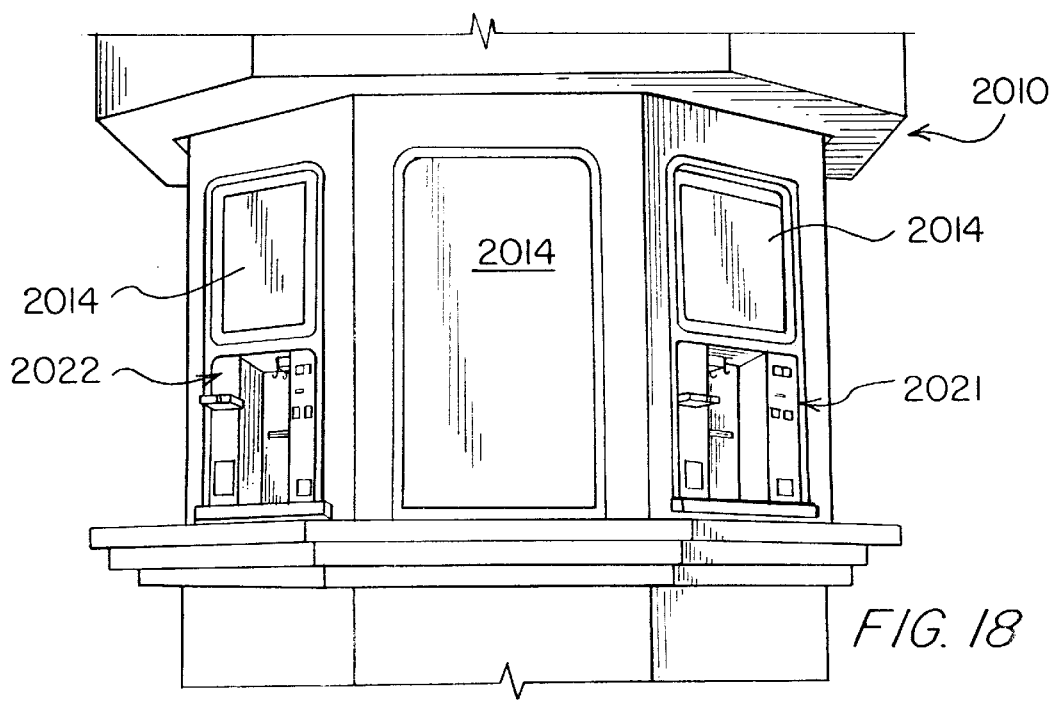
FIG. 18 is a front plan view of a kiosk configured with two ice dispensers.

Referring next to FIG. 18 the kiosk 2010 is configured with two ice dispensing windows 2021, 2022.

Figure 19:
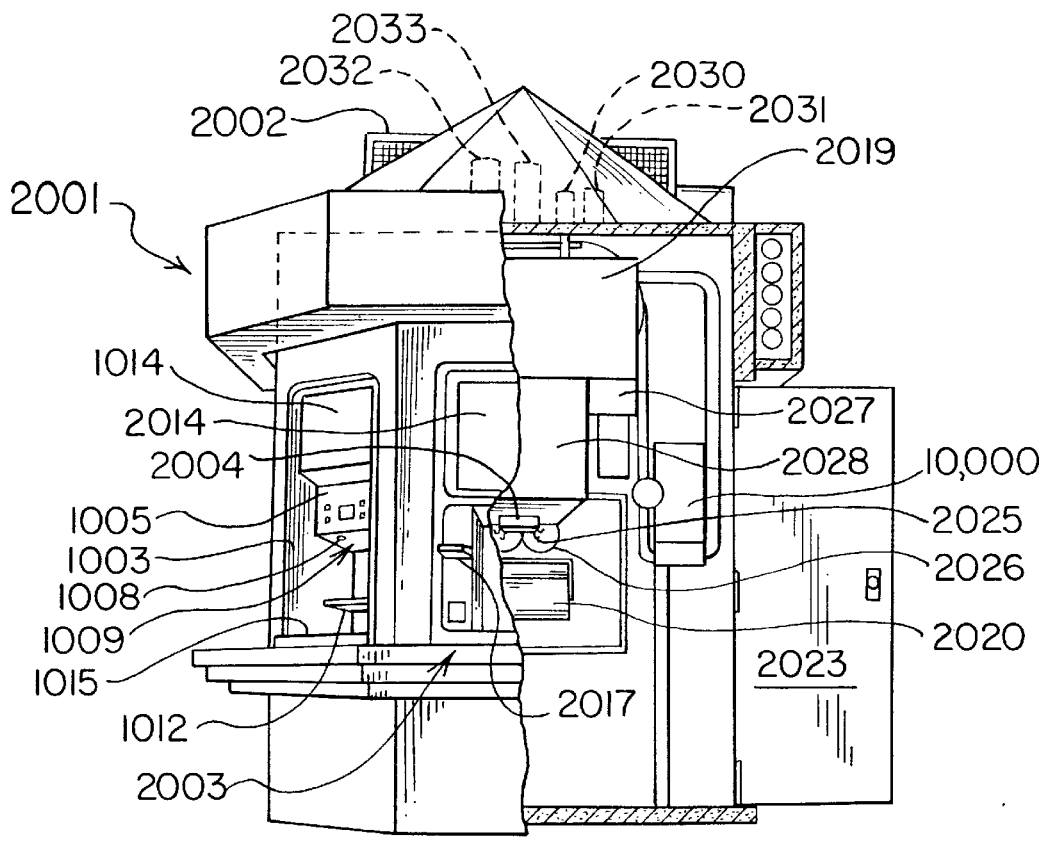
FIG. 19 is the same view as FIG. 17 shown in cutaway with the maintenance door opened.

Referring next to FIG. 19 the kiosk 2001 of FIG. 17 is shown in a partial cutaway view with the service door 2023 open. The roll of bags 2020 can be seen. After dispensing individual bags and filling with ice, the bags are sealed with the tape wrap 2017. A commercial ice-cube maker 2019 is mounted above the ice bin 2028. Motors 2025, 2026 power the auger and agitator inside the ice bin 2028. An air cooler 2027 circulates cold air inside the ice bin 2028 to prevent melting of the ice. The air cooler 2027 has a compressor 2030 and a receiver tank 2031. The ice-cube maker 2019 has a compressor 2032 and a receiver tank 2033. The units 2030–2033 are located on the roof of the kiosk 2001 for space saving and maintainability considerations since the inside of the kiosk 2001 is filled with a water-purification system as shown in FIGS. 22, 23.

Figure 20:
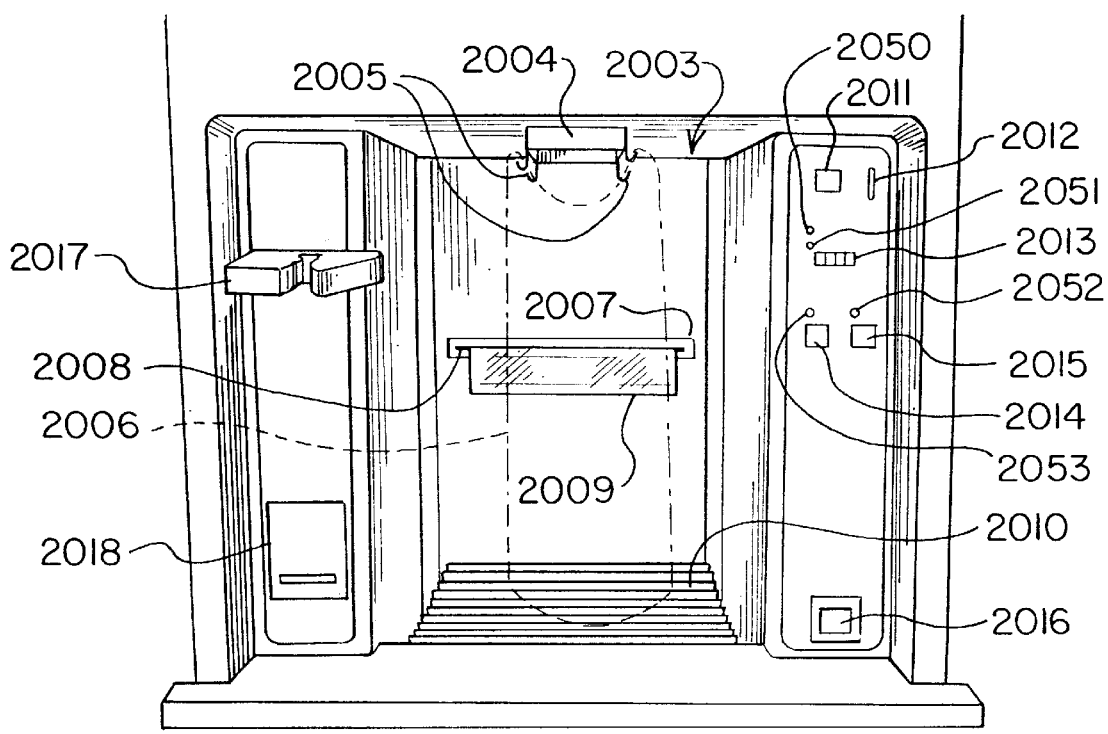
FIG. 20 is a front plan view of the ice dispensing window.

Referring next to FIG. 20 the ice dispensing window 2003 is shown in detail. A consumer may place his ice container on the pedestal 2010 which is a grate having a drain. Alternatively, the consumer could buy an ice bag 2009 from the bag dispenser 2007. The hanging ice bag 2006 is shown in dots suspended from hooks 2005. The ice chute 2004 directs ice cubes into either the ice bag or the consumer's container (not shown). The tape wrap 2017 allows the consumer to tape the ice bag closed. Coins are put into the slot 2012. A coin return button 2011 is provided. The credit display 2013 shows the consumer how much he has deposited. A "correct change only" light 2050 lights up when the coin changer is out of change. When the proper coinage is received, the ice enabling light 2053 and/or the bag enabling light 2052 flashes. To receive his merchandise, the consumer then pushes the ice button 2014 and/or the bag button 2015. A coin return 2016 is provided. A dollar bill acceptor 2018 is also provided. A "sold out" light 2051 lights up for out of ice conditions or when an ice bin door is jammed. The machine is automatically disabled at this time by the controller 10,000.

Figure 22:
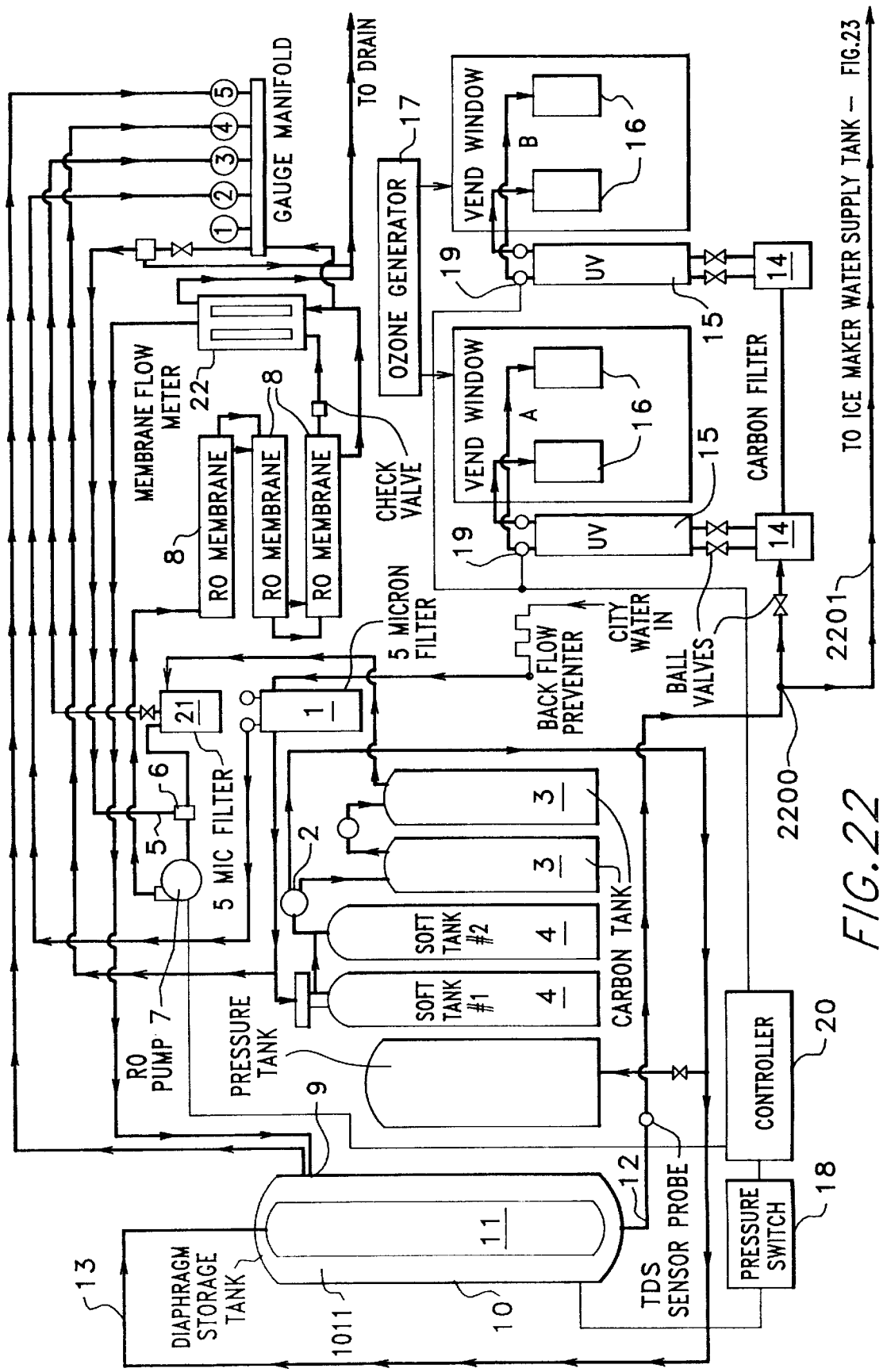
FIG. 22 is a block diagram showing the water filtration system and the tap for the ice-maker water supply tank.
Figure 23:
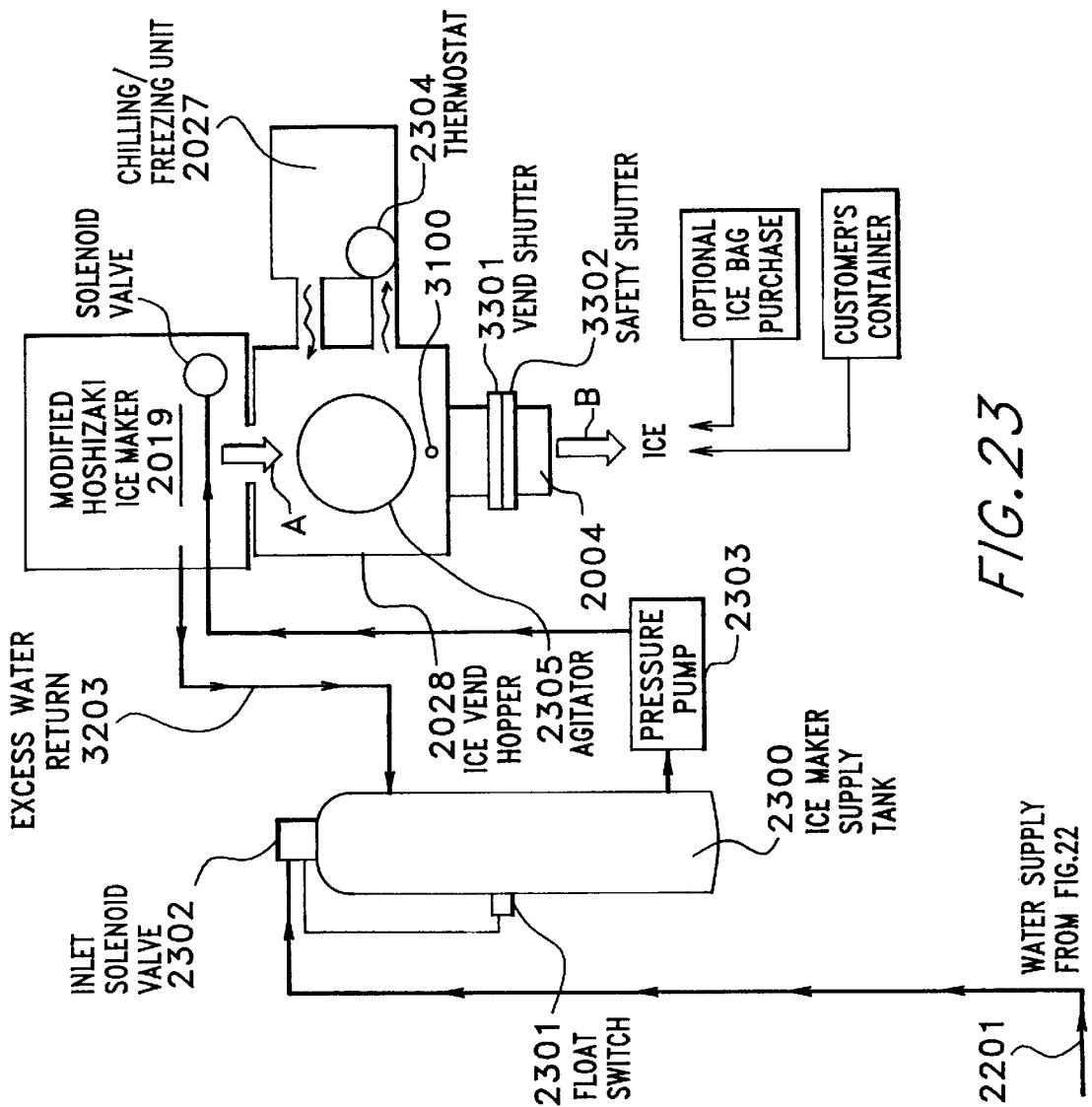
FIG. 23 is a block diagram of the ice dispensing system.

Referring next to FIGS. 21–23 the combined purified water and ice-cube dispensing systems are shown in block diagrams. FIG. 3 and its description is identical to FIG. 22 except for the "T"-junction 2200 of the ice-maker supply line 2201 into the pure water outlet line 12.

In FIG. 23 an ice maker supply tank 2300 is fed by ice maker supply line 2201 and is located inside the kiosk 2001. A float switch 2301 maintains a desired water level by means of a closed loop between the float switch and the inlet solenoid valve 2302. A pump 2303 feeds the ice maker 2019 which is preferably a Hoshizaki® Model KM1600S Series.

Two excess water return lines 3203 reclaim the excess water which is traditionally discarded. Three forces act to prevent the congealing of ice in the bin. First, a thermostat 2304 cycles an air cooler 2027. Second, an agitator 2305 periodically breaks up the ice cubes. Third, an auger 3100 pulls ice cubes along the bottom of the bin 2028 when ice is called for. The ice cubes flow from the ice maker 2019 in direction A and from the ice bin 2028 in direction B. The external safety shutter 3302 discourages tampering, and the internal vend shutter 3301 controls the flow of ice cubes to the chute 2004. The auger controls the ice flow through door 3301.

Figure 24:
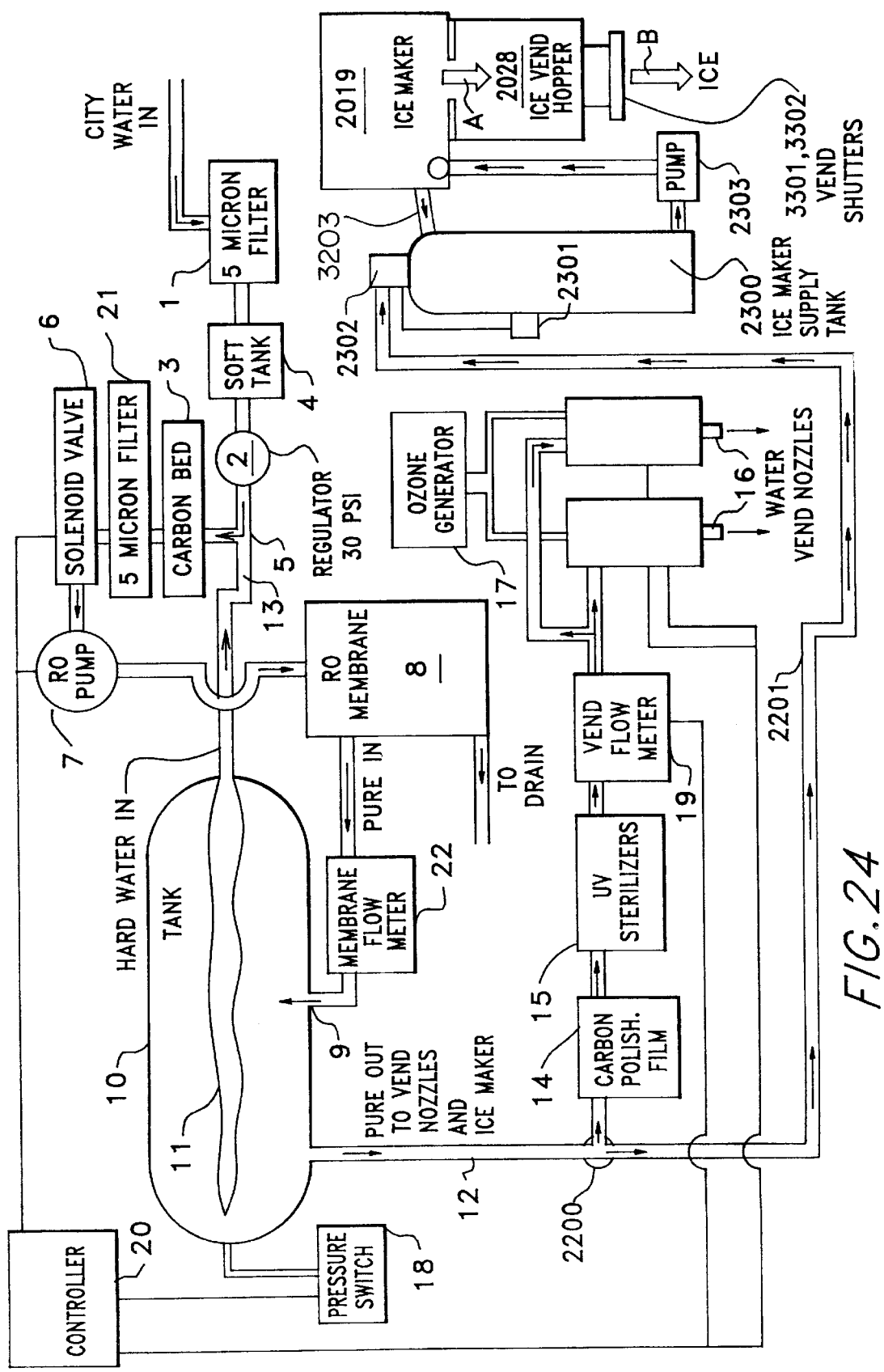
FIG. 24 is a block diagram of the water purification and ice dispensing systems.

Referring next to FIG. 24 a schematic view identical to FIG. 7 is shown with the addition of the "T"-junction 2200, ice-maker supply line 2201, and the ice dispensing system as shown and described in FIG. 23.

Figure 8:
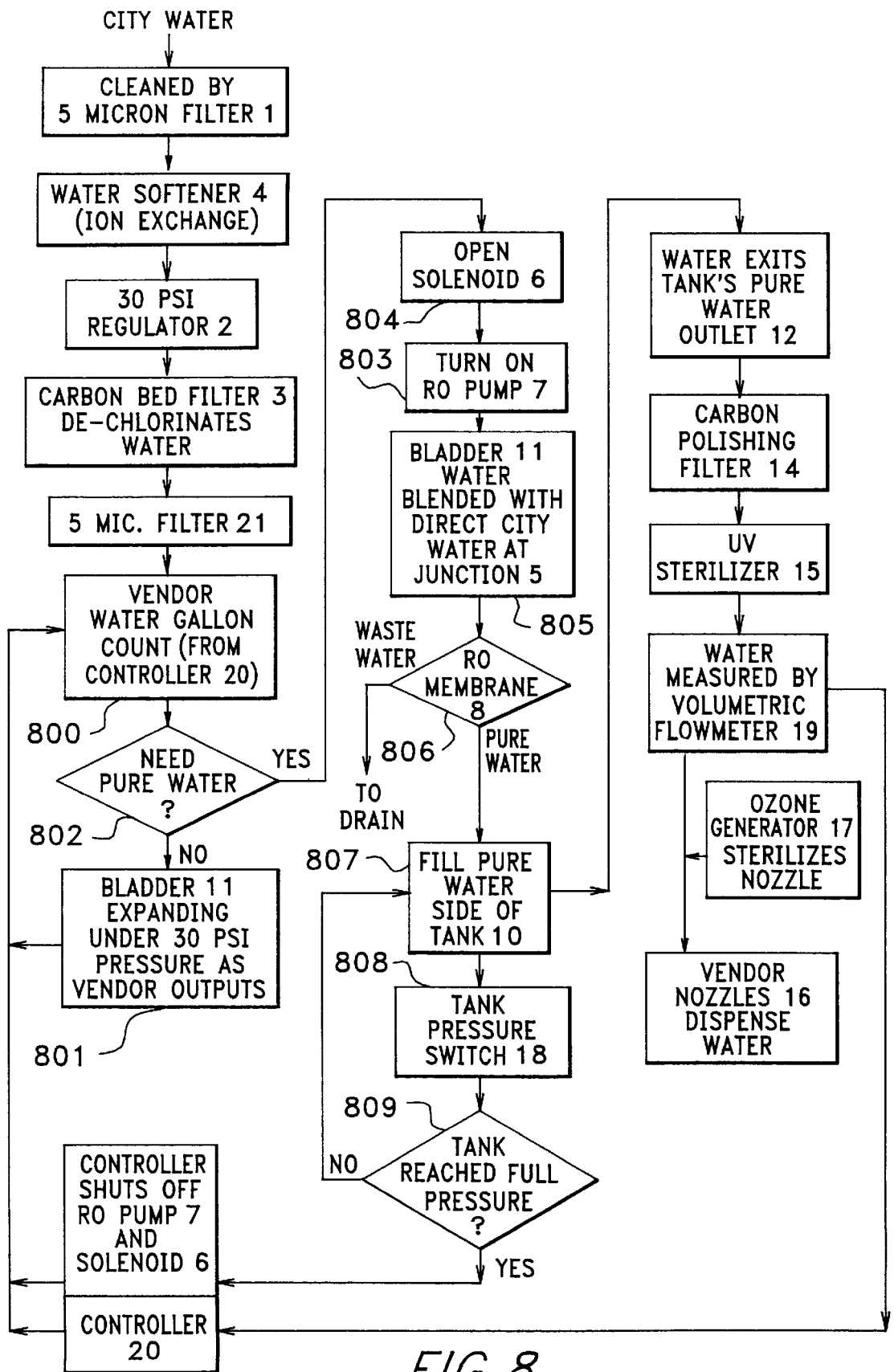
FIG. 8 is a logic flow chart showing the operation of the filter and storage system.
Figure 26:
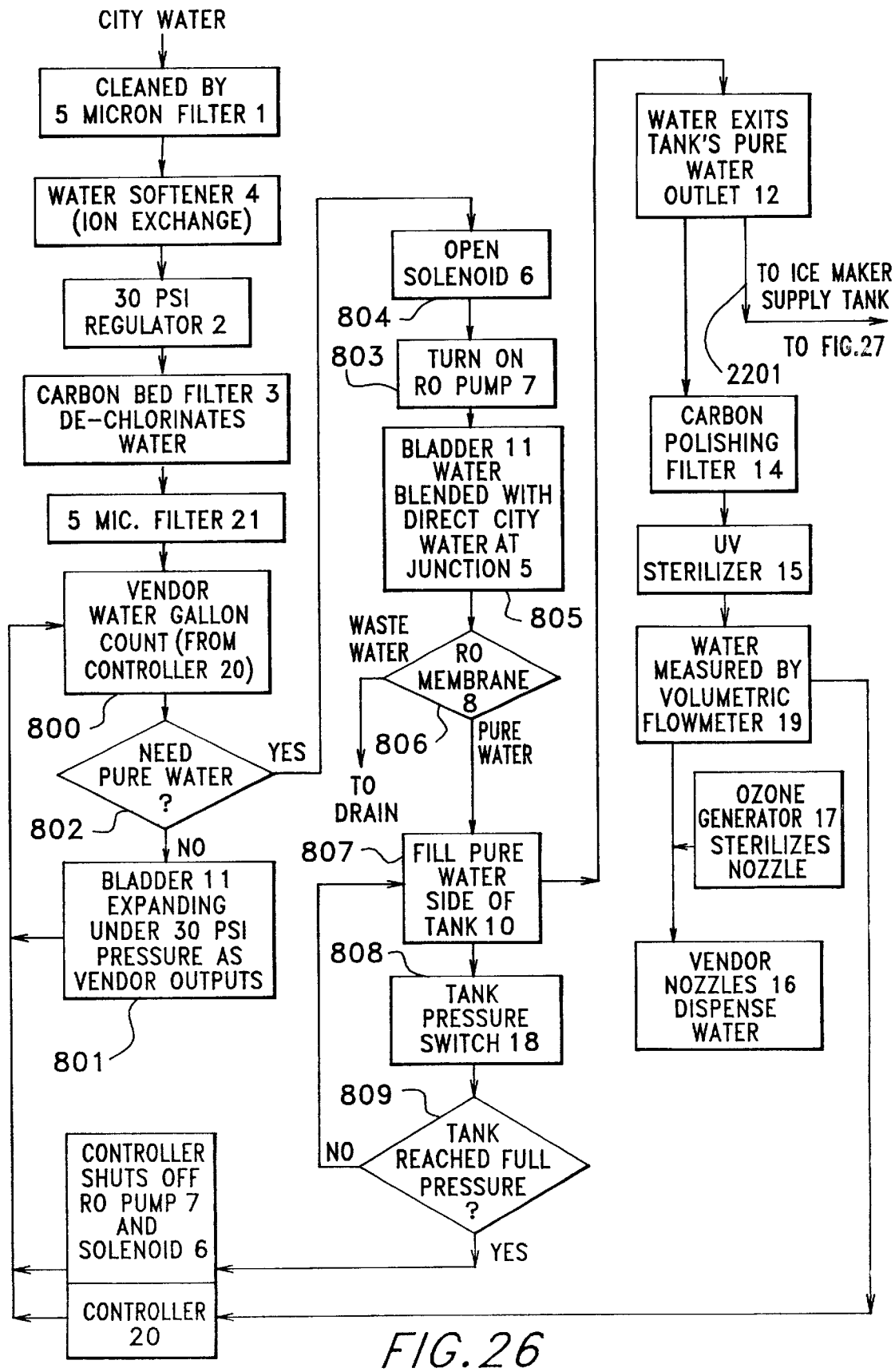
FIG. 26 is a logic flow chart of the water filtration system.
Figure 27:
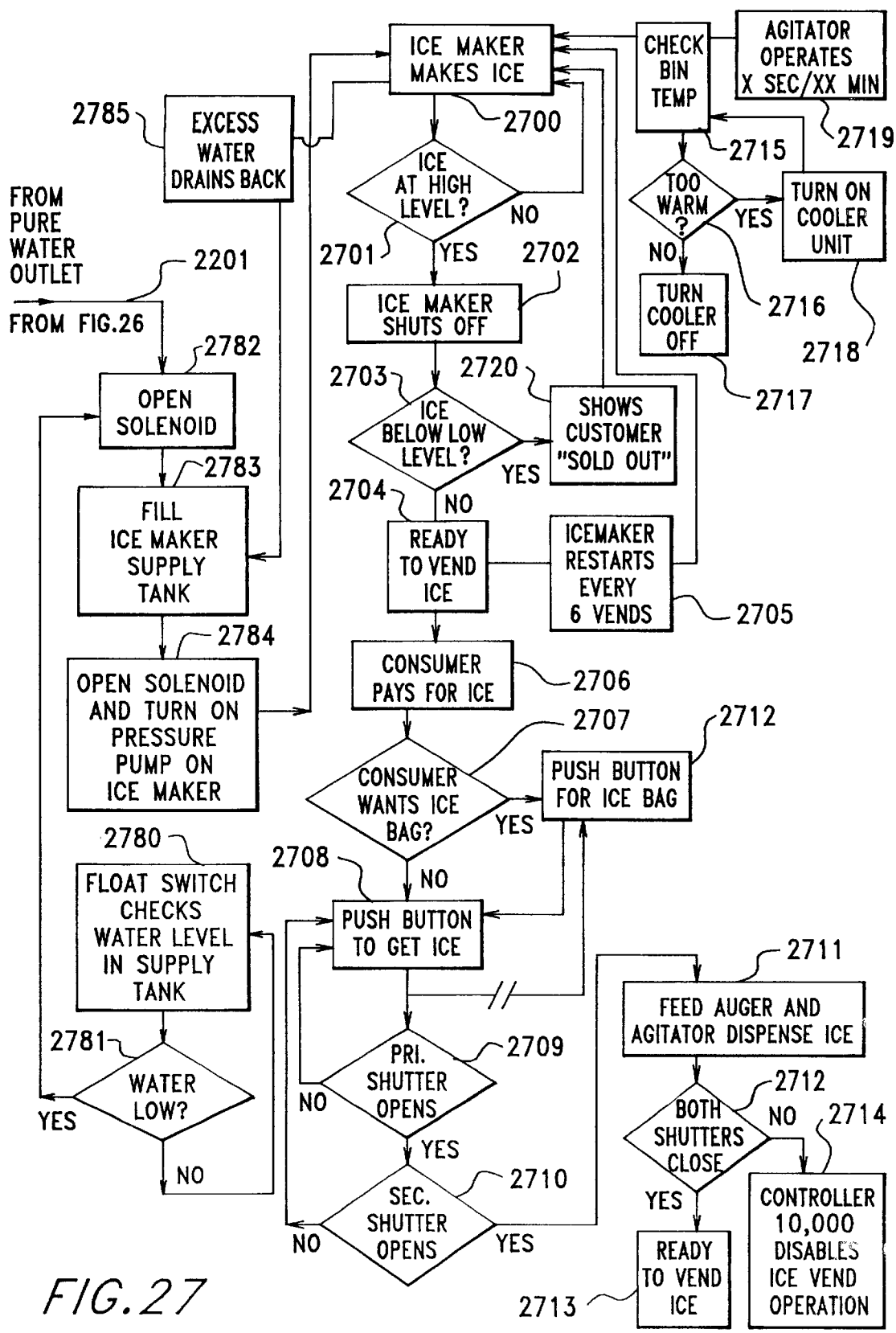
FIG. 27 is a logic flow chart of the ice dispensing system.

Referring next to FIGS. 25–27 FIG. 26 is identical to FIG. 8 with the addition of the ice-maker supply line. 2201.

Referring next to FIG. 27 the following logic is incorporated into the controller 10,000. The ice maker makes ice cubes until the ice-bin high-level sensor shuts the ice maker off (functional blocks 2700, 2701, 2702). If the ice-bin level falls below a low-level sensor, then the "sold out" sign lights up, and the ice maker continues to make ice (functional blocks 2703, 2720, 2700). Whenever the ice-bin level is above the low-level sensor, the system is ready to vend ice (functional block 2704). Automatically after six vends, the ice maker restarts to make ice (functional block 2705).

A separate closed loop-control subsystem keeps the ice-maker supply tank 2300 full. The float switch 2301 and a low water level (functional block 2780). If the water level is low, then the solenoid valve 2302 is opened for a preset time to fill the tank 2300 (functional blocks 2781, 2782, 2783) and turn on the pressure pump 2303 on the ice maker 2019 (functional block 2784). A unique feature of the ice maker is to collect the excess water and re-use it to make ice (functional block 2785).

When the consumer pays (functional block 2706), he may choose to also pay for an ice bag. If he so pays, then he must push the ice-bag button (functional blocks 2707, 2712). The system can be programmed to dispense an ice bag for free. Whether the consumer buys a bag or not, he must push the ice button (functional block 2708). When the ice button is pushed, the system opens the primary and secondary shutter doors (functional blocks 2709, 2710). If either shutter door doesn't open, then the feed auger and agitator do not turn on. If the shutter doors do open, then the ice auger and agitator do turn on, thereby dispensing ice (functional blocks 2709, 2710, 2711). Both shutter doors should close after the timed dispensing of ice. If they do, then the system is ready to vend ice. If not, then the controller disables the coin receiver, and the "sold out" light lights up (functional blocks 2712, 2713, 2714).

At all times, the ice-bin temperature is monitored (functional block 2715). If the temperature rises above the set point, then the cooler is turned on. When the ice bin reaches the set-point temperature, then the cooler is turned off (functional blocks 2716, 2717, 2718).

The agitator is controlled by the controller to operate periodically regardless of whether ice is dispensed (functional block 2719).

Figure 28:
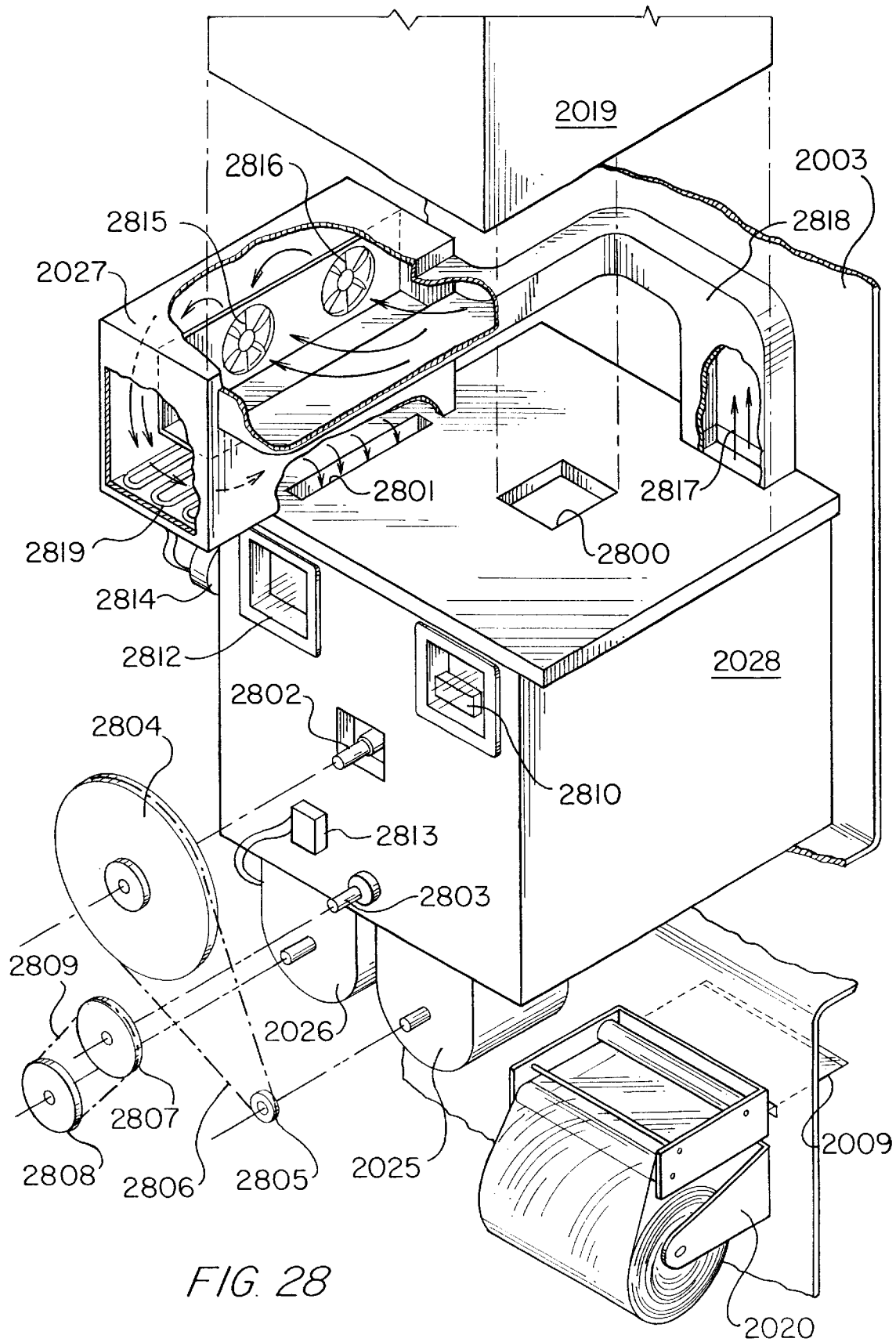
FIG. 28 is a top perspective view of the ice bin, air cooler, and bag dispenser.

Referring next to FIG. 28 the ice maker 2019 (preferably a Hoshizaki® KM 1600S Series) feeds ice cubes into the top of the ice bin 2028 through hole 2800. Essentially there are four ways the system prevents the ice cubes from congealing. First, the walls, top and bottom of the ice bin are insulated. Second, the air cooler 2027 blows cold air into the ice bin through hole 2801. The polarity of the fans 2815, 2816 may be reversed to blow cold air down through hole 2817 and draw air from hole 2801. Third, the agitator shaft 2802 is powered by motor 2025 by means of sprockets 2804, 2805, and chain and clutch 2806. Fourth, the auger shaft 2803 is powered by motor 2026 by means of sprockets 2807, 2808 and chain 2809. The upper-limit ice-level sensor 2810 and a counter in the controller 2811 feed data to the controller 10,000 to turn on the ice maker 2019 unless the ice bin is full. A low-level sensor 2813 activates the "sold out" sign via the controller 10,000. A view port/access port 2812 allows a maintenance technician to inspect the ice bin without opening it. The thermostat 2814 measures the air temperature in the ice bin 2028 to control the on/off status of the air cooler by means of a temperature control unit.

The air cooler 2027 has fans 2815, 2816 which draw air 2817 from the ice bin 2028 via the ductwork 2818 back into the air cooler 2027 and over the cooling coils 2819. The compressor for the cooling coils is shown in FIG. 19 on the roof of the kiosk 2001.

Figure 29:
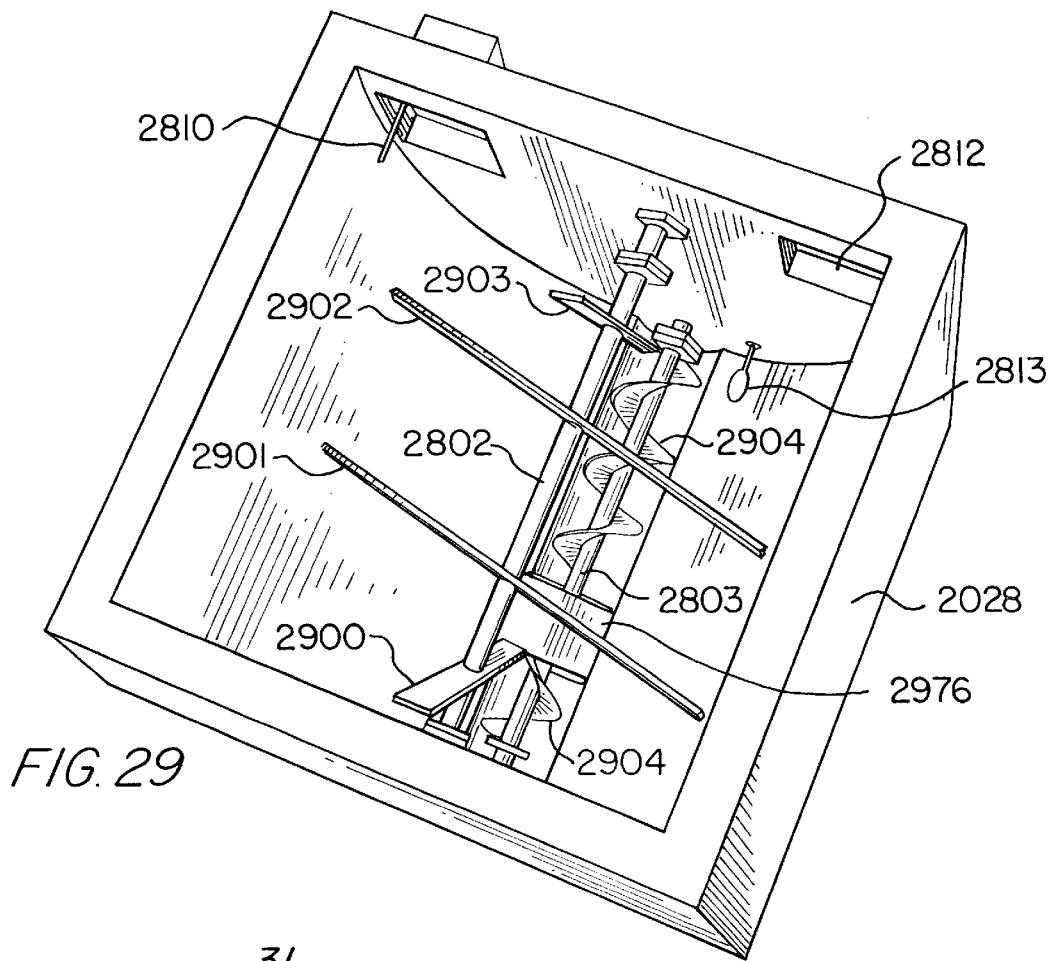
FIG. 29 is a top perspective view of the ice bin with the cover removed.

Referring next to FIG. 29 the "U"-shaped interior of the ice bin 2028 can be seen. Agitator shaft 2802 turns agitator blades 2900, 2901, 2902, 2903. Blades 2901, 2902 are parallel. Blades 2900, 2903 are parallel. Blade sets 2901, 2902 are set off 90° ($\theta_2$) from blade sets 2900, 2903. Auger shaft 2803 turns auger blades 2904 to dispense ice cubes through hole 2905.

Figure 30:
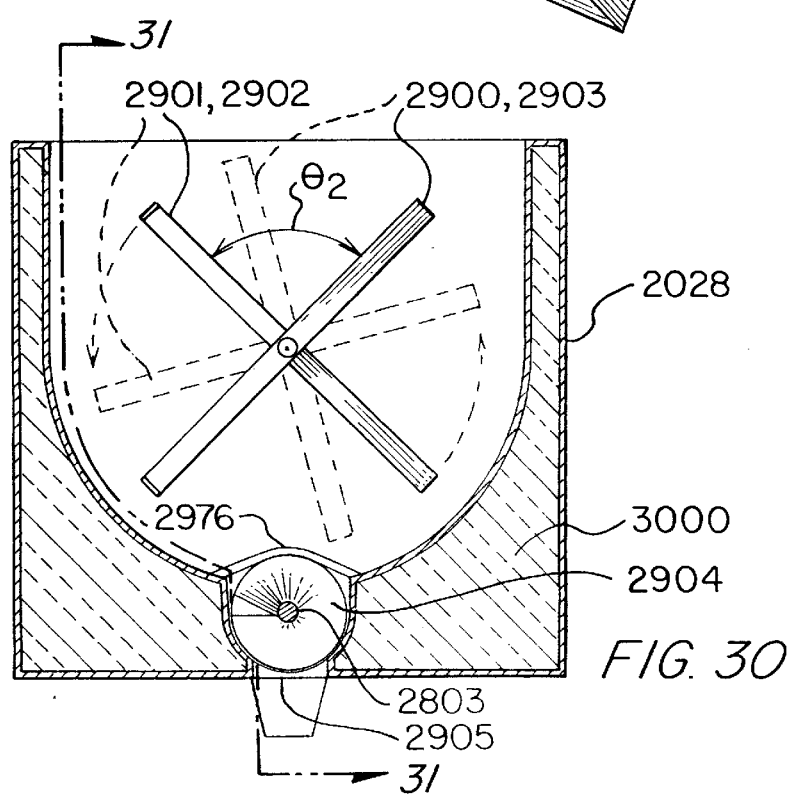
FIG. 30 is a cross-sectional view of the ice bin.

Referring next to FIG. 30 each agitator blade member of a blade set 2901, 2902 is set off 90° from the outside blade set 2900, 2903. The walls, top and bottom, of ice bin 2028 contain insulation 3000. Hole 2905 has a bridge 2976 to prevent ice from falling through the hole after the auger 2904 stops turning. The dotted lines show the position of the blades in FIG. 29.

Figure 31:
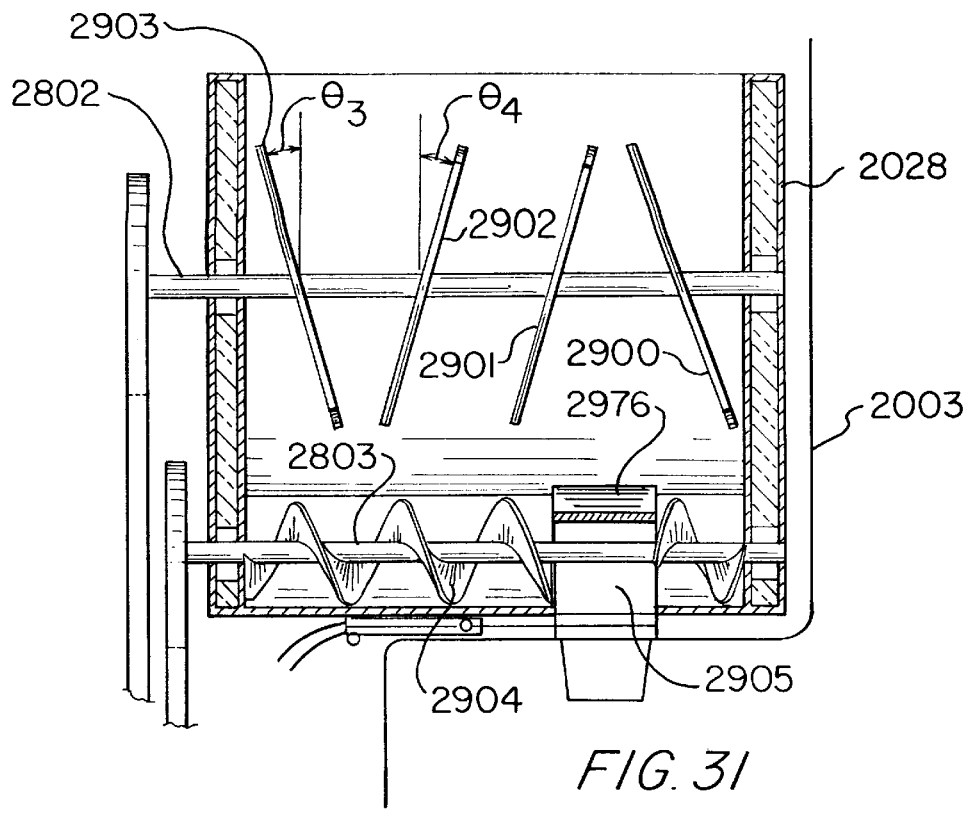
FIG. 31 is a longitudinal sectional view of the ice bin taken along line 31—31 of FIG. 30.

Referring next to FIG. 31 it can be seen that angles $\theta_3$ and $\theta_4$ are equal and approximately 14° off perpendicular from the agitator shaft 2802.

Figure 32:
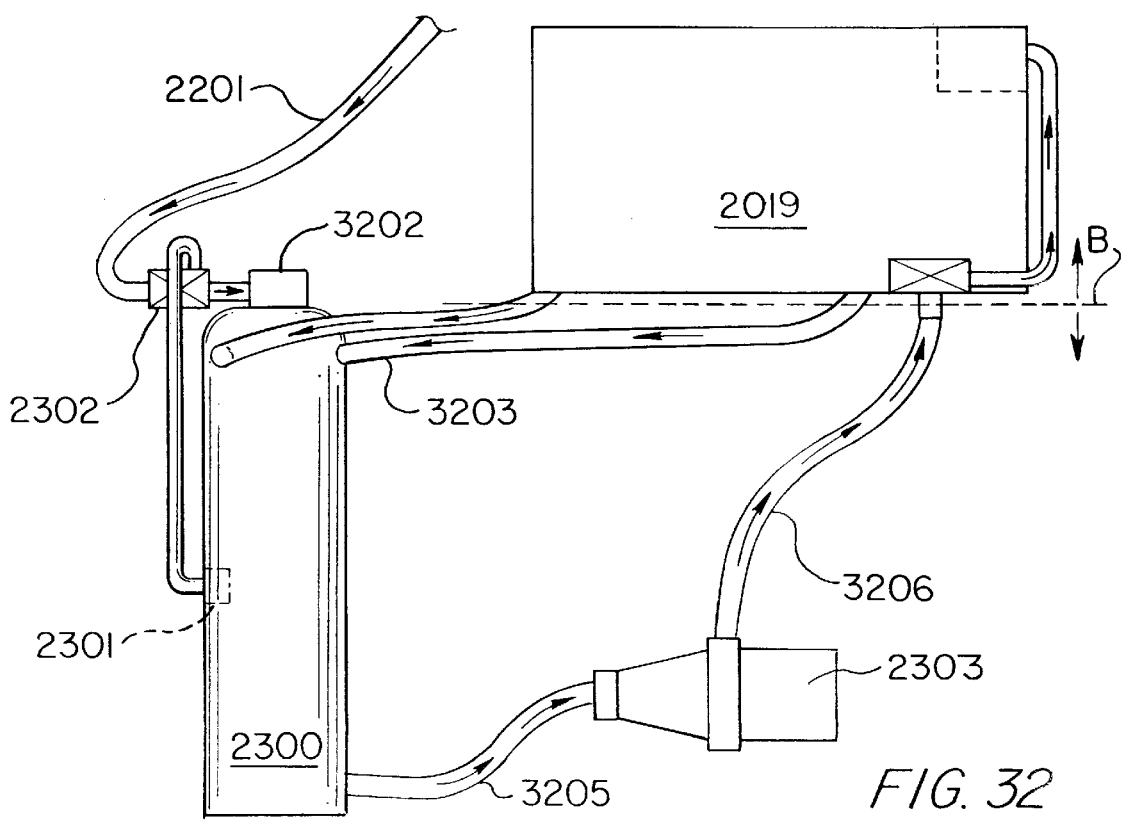
FIG. 32 is a block diagram of the ice maker and the ice maker water supply tank.

Referring next to FIG. 32 all items below line B are novel. All items above line B are prior art. The ice maker 2019 usually discharges and wastes all water not captured in the ice cubes. The present invention adds two reclaim lines 3202, 3203 to recycle the excess ice harvest overflow water from the ice maker 2019. In FIG. 23 these two lines are abbreviated functionally as line 3203. The excess harvest water is returned to the top of tank 2300.

The ice-maker supply tank 2300 has a float switch 2301 which regulates the solenoid valve 2302. The pressure pump 2303 takes water from the bottom of the tank 2300 via line 3205 and pumps the water into the ice maker 2019 via line 3206.

Figure 33:
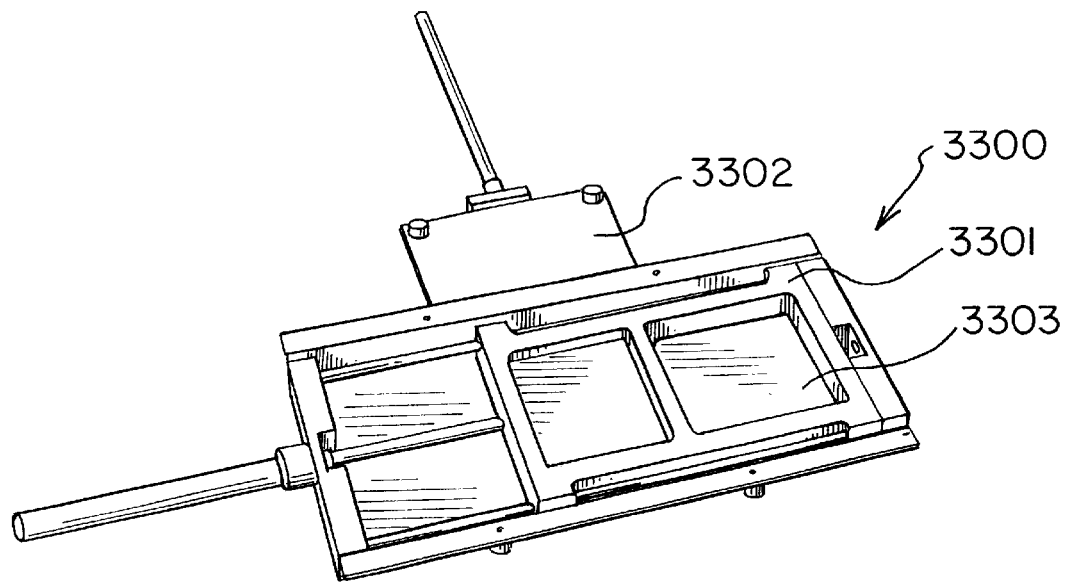
FIG. 33 is a top perspective view of the double door of the ice bin with the outer door open and the inner door closed.
Figure 34:
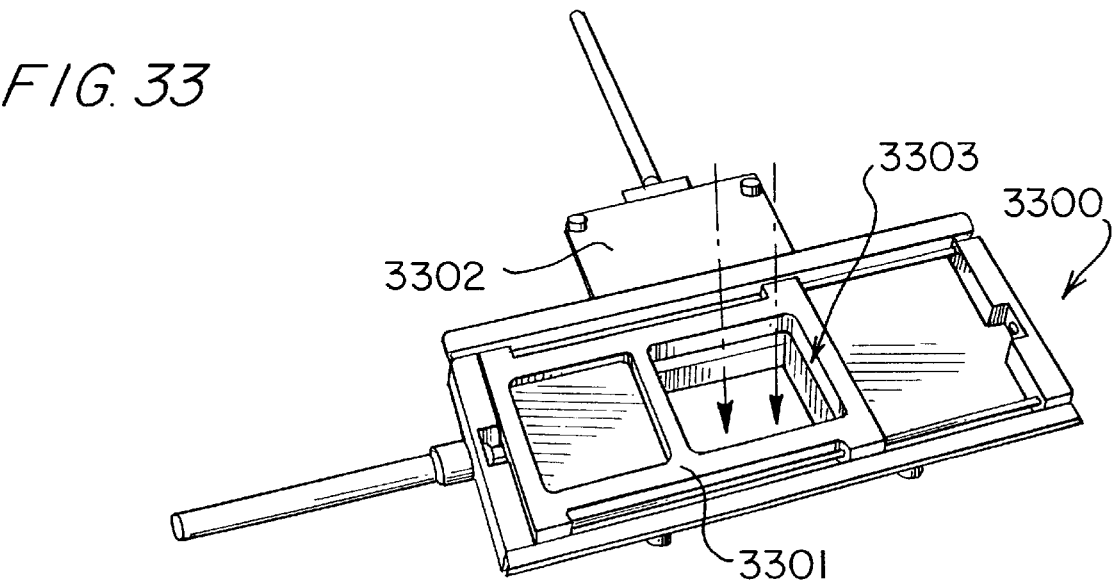
FIG. 34 is a top perspective view of the double door of the ice bin with the outer door open and the inner door open.

Referring next to FIG. 33 the ice shutter assembly 3300 has two pneumatically controlled sliding doors 3301, 3302. Door 3301 has hole 3303 which allows ice to be augured out of the ice bin 2028. Door 3301 has a considerable closing force which could injure fingers. However, door 3302 is a safety door having a minimal closing force which will not injure fingers. If door 3302 cannot close, then door 3301 will not be initiated to close by the controller 10,000. FIG. 33 shows both doors closed. FIG. 34 shows both doors open.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A purified water and ice dispenser comprising:
    a housing having a vend window and a machine room having a filtration system;

the filtration system further comprising:
- a means for pre-filtering city water;
- a means for piping a portion of the pre-filtered water forming a driving fluid into a space substantially enclosed by an inner bladder of a diaphragm storage tank, thereby providing a driving pressure in the inner bladder of the diaphragm storage tank;
- a means for feeding an RO pump and filter membrane with a blend of the stored pre-filtered water in the inner bladder and the pre-filtered city water thereby reclaiming the driving fluid, functioning to feed the RO pump and filter membrane using city water pressure, thereby providing a further filtering of the water, functioning to provide a pure water supply;
- a means for storing the pure water supply in a pure water storage side of the diaphragm storage tank under a pressure, functioning to store the pure water supply between an outer shell of the diaphragm storage tank and the inner bladder;
- a means for dispensing the pure water supply in the pure water storage side of the diaphragm storage tank, functioning to respond to a demand from a user;
- a means for measuring the volume of a quantity of dispensed water demanded by a user; and
- a means for controlling the RO pump by the means for measuring so as to maintain a selected minimum volume of the pure water supply in the pure water side of the diaphragm storage tank;
- an ice-maker supply line tapped into the pure water side of the diaphragm storage tank;
- an ice-maker supply tank receiving water from the ice-maker supply line;
- an ice-cube maker receiving water from the ice-maker supply tank;
- a bin receiving ice cubes from the ice-cube maker; and
- a coin-operated ice-cube dispenser having an ice controller to dispense ice cubes from the bin.

2. The water and ice dispenser of claim 1, wherein the bin further comprises an air cooler in fluid communication with the bin to prevent a congealing or melting of ice.

3. The water and ice dispenser of claim 2, wherein the bin further comprises a horizontally mounted agitator having blades offset at an acute angle from an agitator shaft.

4. The water and ice dispenser of claim 2, wherein the ice maker has a harvest-water return line to the ice-maker supply tank.

5. The water and ice dispenser of claim 1, wherein the bin has an ice exit hole having a first and a second shutter door, said first shutter door having a low closing pressure to prevent injury to a finger, said second shutter door having a high closing pressure and an interface to an ice controller to prevent closure until the first shutter door is closed.

6. The water and ice dispenser of claim 1 further comprising an ice bag dispenser and a bag taper.

7. An ice dispensing system comprising:
- an ice maker having an outlet to fill an ice bin;
- said ice bin having an insulated top, an insulated bottom, and insulated walls;
- said ice bin having an air cooler ducted to an interior ice storage area of the ice bin to cool and recirculate air inside the ice bin to prevent a congealing or thawing of the ice; and
- wherein said insulated top has an inlet port and an outlet port opposed from one another, thereby circulating the air across the insulated top.

8. The ice-dispensing system of claim 7, wherein the air cooler has a temperature sensor connected to a temperature controller to control an air temperature of the air in the ice bin.

9. The ice dispensing system of claim 8, wherein the ice bin has an agitator shaft and two pair of parallel agitator blades, said first pair of agitator blades having an inside location along the agitator shaft and said second pair of agitator blades having a location set off 90°, one member from the first pair on each end of the agitator shaft, said first pair of agitator blades set off about 90° of each pair from the second pair of agitator blades on a projection from the agitator shaft.

10. The ice dispensing system of claim 9, wherein the first pair of agitator blades have an offset to the agitator shaft of about 76°, and the second pair of agitator blades have an equal and opposite offset.

11. The ice-dispensing system of claim 8, wherein the air cooler has an inlet duct, a cooling coil, a condenser, a circulating fan, and a return duct to the ice bin.

12. The ice-dispensing system of claim 7 further comprising an ice-maker supply tank and an excess harvest-water supply line from the ice-maker to the ice-maker supply tank.

13. The ice-dispensing system of claim 12 further comprising a pressure pump to feed water from the ice-maker supply tank to the ice maker.

14. The ice-dispensing system of claim 7, wherein the ice bin has two shutter doors, a first shutter door to control a flow of ice, and a safety shutter door to close gently.

15. The ice dispensing system of claim 7 further comprising a coin and bill receiver to input money-receipt data to the ice controller, a bag dispenser, and a taper.

16. The ice-dispensing system of claim 15 further comprising a coin/bill-operated purified water-dispensing system housed in a common kiosk.

17. The ice dispensing system of claim 7, wherein the ice bin has a low-level sensor connected to the controller, thereby triggering a "sold out" sign.

18. The ice bin of claim 7 further comprising an auger and an agitator and an independent drive mechanism for each of said auger and said agitator.

19. The ice bin of claim 18, wherein the agitator and the auger each have an independent drive motor.

20. The ice bin of claim 18 further comprising a delivery trough at a bottom of the ice bin, said delivery trough housing the auger, a delivery hole in the trough, and a bridge over the delivery hole to prevent ice from falling through the delivery hole after the auger stops turning.

21. An ice bin in an ice-cube dispenser, said ice bin comprising;
- insulated walls, an insulated top and an insulated bottom;
- an agitator blade;
- a feed auger;
- an air cooler ducted to an interior ice storage area of the ice bin to cool and circulate air in the ice bin; and
- wherein said insulated top has an inlet port and an outlet port opposed from one another, thereby circulating the air across the insulated top.

22. The ice bin of claim 21 further comprising an ice controller and a bin air-temperature sensor and control to control the air cooler.

23. The ice bin of claim 21 further comprising an auger and an agitator and an independent drive mechanism for each of said auger and said agitator.

24. The ice bin of claim 23, wherein the agitator and the auger each have an independent drive motor.

25. The ice bin of claim 23 further comprising a delivery trough at a bottom of the ice bin, said delivery trough housing the auger, a delivery hole in the trough, and a bridge over the delivery hole to prevent ice from falling through the delivery hole after the auger stops turning.

26. An ice dispensing system comprising:

an ice maker having an outlet to fill an ice bin;

said ice bin having an insulated top, an insulated bottom, and insulated walls; and wherein said ice bin has two shutter doors, a first shutter door to control a flow of ice, and a second shutter door which closes gently, thereby functioning as a safety door.

27. An ice dispensing system comprising:

an ice maker having an outlet to fill an ice bin;

said ice bin having an insulated top, an insulated bottom, and insulated walls; and wherein said ice bin has a delivery trough at a bottom of the ice bin;

an auger in the delivery trough;

a delivery hole in the trough; and a bridge over the delivery hole to prevent ice from falling through the delivery hole unless the auger is turning.

* * * * *